US010296054B2

(12) United States Patent
Holung et al.

(10) Patent No.: US 10,296,054 B2
(45) Date of Patent: May 21, 2019

(54) LOBSTER HINGE ASSEMBLY

(71) Applicant: Lenovo (Singapore) Pte. Ltd., Singapore (SG)

(72) Inventors: Joseph Anthony Holung, Wake Forest, NC (US); Tin-Lup Wong, Chapel Hill, NC (US); Bouziane Yebka, Apex, NC (US); Joseph David Plunkett, Raleigh, NC (US); Philip John Jakes, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 96 days.

(21) Appl. No.: 15/019,820

(22) Filed: Feb. 9, 2016

(65) Prior Publication Data
US 2017/0227993 A1 Aug. 10, 2017

(51) Int. Cl.
*E05D 3/06* (2006.01)
*E05D 5/04* (2006.01)
*G06F 1/16* (2006.01)
*H04M 1/02* (2006.01)
*E05D 11/06* (2006.01)

(52) U.S. Cl.
CPC ............ *G06F 1/1681* (2013.01); *E05D 3/06* (2013.01); *E05D 5/04* (2013.01); *E05D 11/06* (2013.01); *G06F 1/1616* (2013.01); *G06F 1/1643* (2013.01); *G06F 1/1652* (2013.01); *H04M 1/0216* (2013.01); *H04M 1/0268* (2013.01); *H04M 1/0277* (2013.01); *E05Y 2900/606* (2013.01); *H04M 2201/34* (2013.01); *H04M 2201/36* (2013.01); *H04M 2201/38* (2013.01)

(58) Field of Classification Search
CPC ........... H04M 1/0216; H04M 2201/34; H04M 2201/38; H04M 1/0268; H04M 1/0277; H04M 1/0247; H04M 1/0266; H04M 1/022; G06F 1/1681; G06F 1/1616; G06F 1/1643; G06F 1/1652; G06F 1/1601; G06F 1/1618; G06F 1/16; G06F 1/163; E05D 3/06; E05D 5/04; E05D 11/06; E05D 3/04; E05D 7/00; E05D 3/122; E05D 7/04; E05D 7/125; E05D 7/0009; E05Y 2900/606
USPC ............................... 361/679.28, 679.27, 749
See application file for complete search history.

(56) References Cited

U.S. PATENT DOCUMENTS

| | | | | |
|---|---|---|---|---|
| 2,206,739 | A * | 7/1940 | Brogren | E05D 3/06 16/354 |
| 5,501,408 | A * | 3/1996 | Kang | G11B 15/32 242/356.5 |
| 5,987,704 | A * | 11/1999 | Tang | G06F 1/1681 16/342 |
| 6,831,229 | B1 * | 12/2004 | Maatta | G06F 1/1616 174/50 |
| 9,173,287 | B1 * | 10/2015 | Kim | H05K 1/028 |

(Continued)

*Primary Examiner* — Dimary S Lopez Cruz
*Assistant Examiner* — Ingrid D Wright
(74) *Attorney, Agent, or Firm* — Brian J. Pangrle

(57) ABSTRACT

An apparatus can include a processor; memory accessible by the processor; a first housing that includes a first link end; a second housing that includes a second link end; and a hinge assembly that includes a first link coupled to the first link end via a first axle, a second link coupled to the second link end via a second axle and an intermediate axle that operatively couples the first link and the second link where stop surfaces of the first and second links define a minimum radius of curvature of the hinge assembly.

25 Claims, 19 Drawing Sheets

(56) References Cited

U.S. PATENT DOCUMENTS

| | | | | |
|---|---|---|---|---|
| 9,625,954 | B2* | 4/2017 | Campbell | G06F 1/1681 |
| 2005/0122671 | A1* | 6/2005 | Homer | G06F 1/1618 |
| | | | | 361/679.27 |
| 2010/0064648 | A1* | 3/2010 | Koshihara | A01D 34/90 |
| | | | | 56/10.1 |
| 2012/0120618 | A1* | 5/2012 | Bohn | G06F 1/1681 |
| | | | | 361/749 |
| 2013/0021762 | A1* | 1/2013 | van Dijk | G06F 1/1652 |
| | | | | 361/749 |
| 2014/0245569 | A1* | 9/2014 | Cho | E05D 3/122 |
| | | | | 16/370 |
| 2015/0277506 | A1* | 10/2015 | Cheah | G06F 1/1681 |
| | | | | 361/679.27 |
| 2015/0370287 | A1* | 12/2015 | Ko | G06F 1/1626 |
| | | | | 361/749 |
| 2016/0132075 | A1* | 5/2016 | Tazbaz | G06F 1/1681 |
| | | | | 361/679.27 |
| 2016/0132076 | A1* | 5/2016 | Bitz | G06F 1/1681 |
| | | | | 361/679.27 |

* cited by examiner

US 10,296,054 B2

LOBSTER HINGE ASSEMBLY

TECHNICAL FIELD

Subject matter disclosed herein generally relates to technology for hinges, for example, hinge assemblies for computing or other devices.

BACKGROUND

Various types of devices, display devices, computing and display devices, etc. exist where, for example, a hinge assembly allows for orienting one portion with respect to another portion. For example, a display portion may be oriented with respect to a keyboard portion.

SUMMARY

An apparatus can include a processor; memory accessible by the processor; a first housing that includes a first link end; a second housing that includes a second link end; and a hinge assembly that includes a first link coupled to the first link end via a first axle, a second link coupled to the second link end via a second axle and an intermediate axle that operatively couples the first link and the second link where stop surfaces of the first and second links define a minimum radius of curvature of the hinge assembly. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
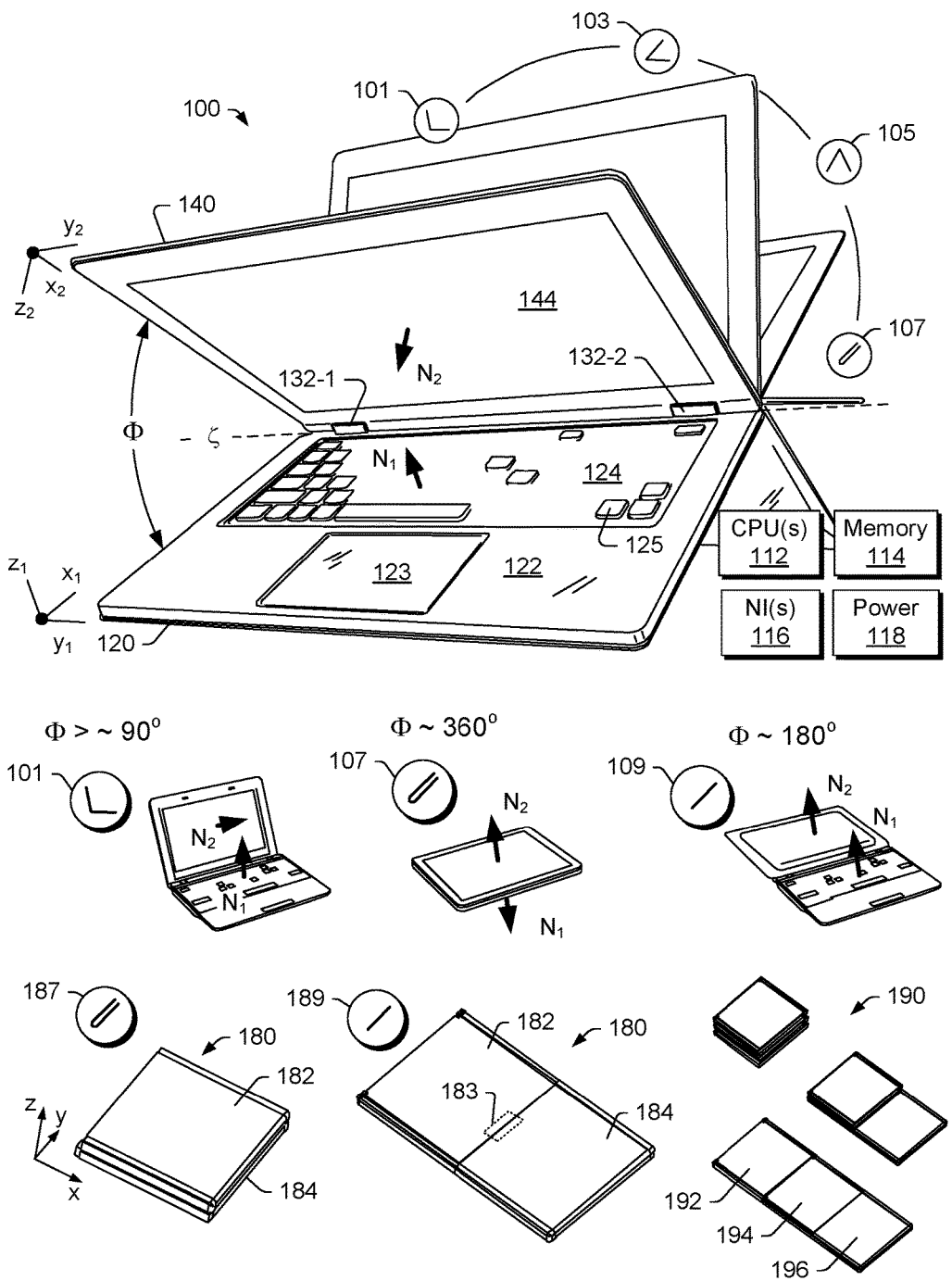
FIG. 1 is a diagram of examples of systems.

FIG. 1 shows an example of a system 100 that includes a keyboard housing 120 and a display housing 140 that are pivotable with respect to each other via movement about one or more hinges 132-1 and 132-2 (e.g., hinge assemblies). FIG. 1 also shows an example of a system 180 that includes a first housing 182 and a second housing 184 that are pivotable with respect to each other via movement about one or more hinges 183 (e.g., hinge assemblies) and an example of a system 190 that includes a first housing 192, a second housing 194 and a third housing 196 that may be pivotable with respect to each other via movement about hinges.

As an example, the system 100, the system 180 and/or the system 190 may include one or more processors 112, memory 114 (e.g., one or more memory devices), one or more network interfaces 116, and one or more power cells 118. Such components may be, for example, housed with the keyboard housing 120, the display housing 140, the keyboard housing 120 and the display housing 140, the housing 182, the housing 184, the housing 182 and the housing 184, one or more of the housings 192, 194 and 196, etc.

As shown in the example of FIG. 1, the keyboard housing 120 includes a keyboard 124 with keys 125 and the display housing 140 includes a display 144. In such an example, the keyboard 124 is defined in a first Cartesian coordinate system as having a width along an x-axis ($x_1$), a length along a y-axis ($y_1$) and a height along a z-axis ($z_1$) that extends in a direction outwardly away from touch surfaces of keys 125 of the keyboard 124 and the display 144 is defined in a second Cartesian coordinate system as having a width along an x-axis ($x_2$), a length along a y-axis ($y_2$) and a height along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ξ and an angle Φ about that axis.

FIG. 1 shows some examples of orientations 101, 103, 105, 107 and 109. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both). As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.).

As to the orientation 103, it may correspond to a display orientation for viewing the display 144 where the keyboard 124 faces downward and the system 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the system 100 (e.g., where the angle Φ is about 0 degrees), the vectors $N_1$ and $N_2$ would be pointing toward each other.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

As shown in FIG. 1, the system 180 can include a folded orientation 187 and a planar orientation 189. As an example, one or both of the housings 182 and 184 may include a display. As shown in FIG. 1, the system 190 can include various orientations, including, for example, a planar orientation of the three housings, a partially folded orientation and a folded orientation. As an example, a three housing system may be configurable in more than one folded orientation with respect to a "middle" housing. For example, the housings 192 and 196 may be folded with respect to the housing 194 with the housing 192 on the top side or bottom side or with the housing 196 on the top side or bottom side.

Figure 2:
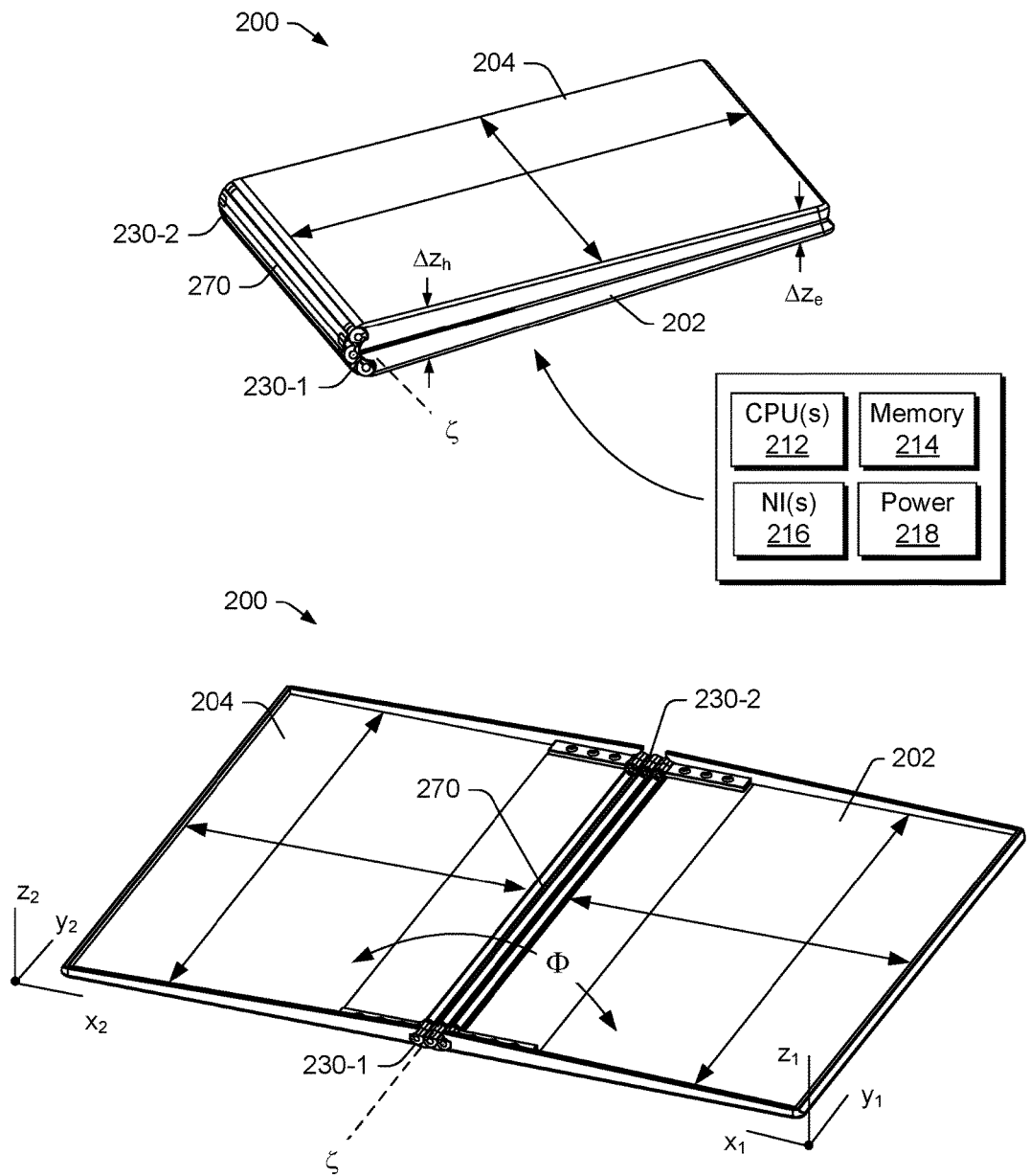
FIG. 2 is a diagram of an example of a device with a hinge assembly.

FIG. 2 is a diagram of an example of a device 200 that includes a first housing 202, a second housing 204, a hinge assembly or hinge assemblies 230-1 and 230-2 and plates 270. In the example of FIG. 2, the hinge assembly 230-1 and the hinge assembly 230-2 may be mirror images of each other. As an example, when viewing the device 200 from the hinge end, the hinge assembly 230-1 may be referred to as a right side hinge assembly and the hinge assembly 230-2 may be referred to as a left side hinge assembly.

As shown in the example of FIG. 2, the device 200 can be oriented in a closed orientation (e.g., a closed state) and in an open orientation (e.g., an open state). As an example, the device 200 can be oriented at an intermediate orientation, for example, an orientation corresponding to an angle (Θ) that is in a range from about 0 degrees to about 180 degrees.

As an example, the device 200 may include one or more processors 212, memory 214 (e.g., one or more memory devices), one or more network interfaces 216, and one or more power cells 218. Such components may be, for example, housed with the first housing 202 and/or the second housing 204.

In the example of FIG. 2, the device 200 can include one or more types of circuitry, optionally one or more types of circuitry as described with respect to the system 100 of FIG. 1. As an example, the device 200 can include a flexible circuit board that spans at least a portion of the first housing 202 and that spans at least a portion of the second housing 204. In such an example, the hinge assemblies 230-1 and 230-2 can define a radius of curvature that allows for bending of the flexible circuit board. For example, the radius of curvature may allow for repeated bending and unbending of the flexible circuit board over a number of cycles where one or more circuits that extend across the bend can operate without an excessive risk of failure.

As an example, the device 200 can include multiple circuit boards where, for example, one or more flexible connectors (e.g., wires, optical guides, etc.) connect two or more of the circuit boards, which may be disposed in different housings. For example, consider a first circuit board disposed in the first housing 202 and a second circuit board disposed in the second housing 204 being operatively coupled via wires and/or optical guides that span the first and second housings 202 and 204 across the hinge defined at least in part by the hinge assemblies 230-1 and 230-2.

As an example, the device 200 can include a display that includes at least one flexible portion. In such an example, the display can be disposed at least in part in the first housing 202 and be disposed at least in part in the second housing 204 where the hinges assemblies 230-1 and 230-2 define a minimum radius of curvature in the closed orientation of the device 200 that avoids damage to the display. As an example, such a display may be a touchscreen display where, for example, one portion of the touchscreen display may render a graphic of a keyboard (e.g., a computer keyboard with letter keys, etc.). For example, consider the first housing 202 including a portion of a touchscreen display that can be utilized as a keyboard and the second housing 204 including a portion of a touchscreen display that can be utilized as a display. As an example, such a device may automatically detect a device orientation to determine which portion of the touchscreen display is to be a keyboard and which portion of the touchscreen display is to be a display. For example, the device 200 can be operated with the first housing 202 on a planar surface (e.g., a desk), on a lap, etc. or the device 200 may be operated with the second housing 204 on a planar surface, on a lap, etc. In such an example, a user need not necessarily be aware of an orientation of the device 200 (e.g., the device 200 can be self-aware and configure itself responsive to sensing its own orientation in space, for example, with respect to gravity, etc.).

As an example, the device 200 can include two displays where, for example, one display is disposed in the first housing 202 and where the other display is disposed in the second housing 204. As an example, the first housing 202 and/or the second 204 can be a frame where, for example, a display can be oriented outwardly. For example, consider the closed orientation of the device 200 where the second housing 204 includes an outwardly facing display, which may be a touchscreen display. In such an example, the device 200 may be operated in a tablet mode. As an example, upon opening the device 200, the device 200 may transition from a tablet mode to a laptop mode or another mode, as desired. For example, in the open orientation of FIG. 2, the device may be operated in a tablet mode where the tablet screen size is approximately the size of the two housings 202 and 204 combined. In such an example, the device 200 may be in an extended tablet mode. As an example, upon transitioning the device 200 to an angle less than about 180 degrees (e.g., about 170 degrees or less), the device 200 may transition to a laptop (e.g., notebook) mode. In such a laptop mode, one of the housings 202 and 204 can include a keyboard portion, which may be rendered to a touchscreen display.

As an example, a device can include a processor; memory accessible by the processor; a first housing that includes a first link end; a second housing that includes a second link end; and a hinge assembly that includes a first link coupled to the first link end via a first axle, a second link coupled to the second link end via a second axle and an intermediate axle that operatively couples the first link and the second link where stop surfaces of the first and second links define a minimum radius of curvature of the hinge assembly.

As an example, a device can include a processor; memory accessible by the processor; a first housing; a second housing; and a hinge assembly operatively coupled to the first and second housings where the hinge assembly includes a first set of links and at least three axles, a second set of links and at least three axles and plates that extend between at least some of the links of the first and second sets of links where a set of stop surfaces of the links define a minimum radius of curvature of the hinge assembly.

Figure 3:
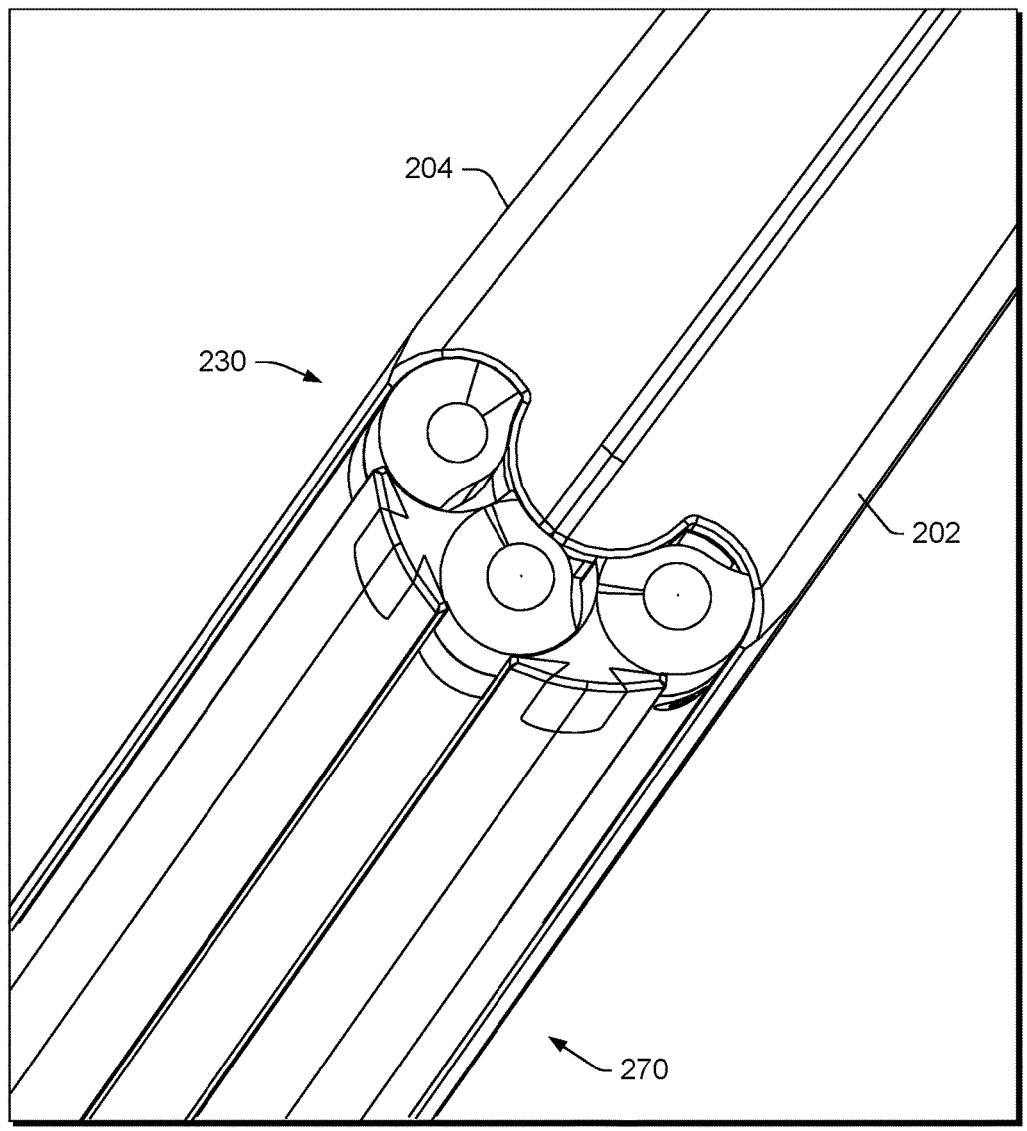
FIG. 3 is a diagram of a portion of the device of FIG. 2.

FIG. 3 shows a portion of the device 200 of FIG. 2 where a hinge assembly 230 (see, e.g., the hinge assembly 230-1 of FIG. 2) operatively couples the first housing 202 and the second housing 204 and where various plates 270 include plates that are operatively coupled to the hinge assembly 230.

Figure 4:
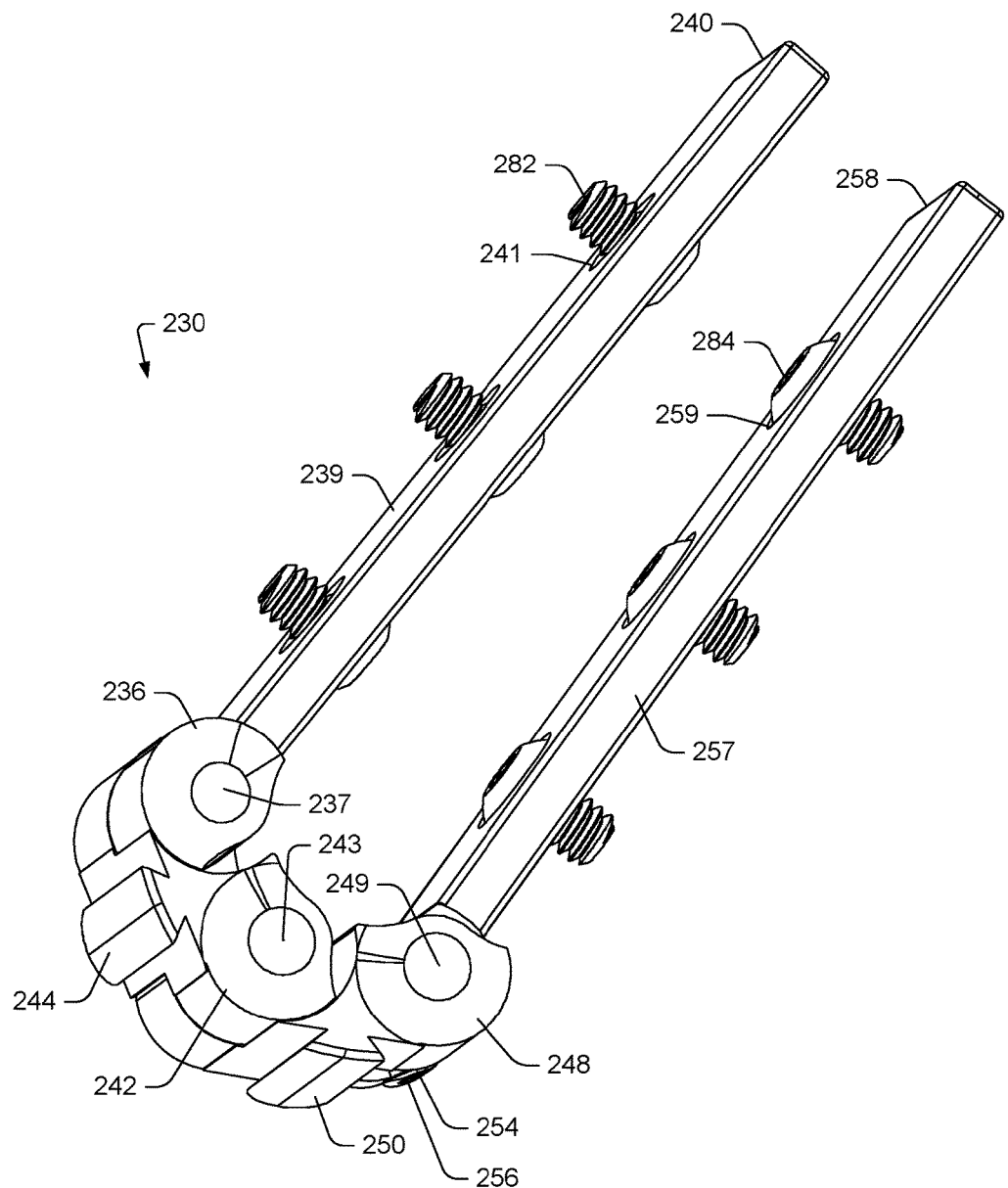
FIG. 4 is a diagram of an example of a hinge assembly.

FIG. 4 shows the hinge assembly 230 of FIG. 3, which may be the right side hinge assembly 230-1 of FIG. 2, along with link ends 236 and 254, which include extensions 239 and 257, respectively, that extend to extensions ends 240 and 258, respectively, where connection features such as, for example, openings 241 and 259, can receive bolts 282 and 284 (e.g., screws, etc.), respectively, to operatively couple the hinge assembly 230 to a first housing and to a second housing (e.g., the first housing 202 and the second housing 204). For example, the housing 202 may be operatively coupled to the extension 257 and the housing 204 may be operatively coupled to the extension 239.

As shown in the example of FIG. 4, the hinge assembly 230 includes links 242 and 248 that are operatively coupled to the link end 236 and the link end 254, respectively, about axes 237 and 249, respectively. Such axes may be considered end axes where at least one intermediate axis is disposed between these end axes. For example, in FIG. 4, an intermediate axis 243 is disposed between the end axes 237 and 249 where the links 242 and 248 are pivotably coupled about the intermediate axis 243 as a pivot axis.

In the example of FIG. 4, the link 242 includes a plate fixture 244, the link 248 includes a plate fixture 250 and the link end 254 includes a plate fixture 256, which may differ in shape with respect to the plate fixtures 244 and 250. For example, the plate fixture 256 can include a threaded opening that can receive a bolt (e.g., a screw, etc.) that can fix a plate to the link end 254.

As shown in the example of FIG. 4, the hinge assembly 230 includes the link 242 pivotably coupled to the link end 236 and the link 248 pivotably coupled to the link end 254 such that these four components 236, 242, 248 and 254 are linked about the three axes 237, 243 and 249.

Figure 5:
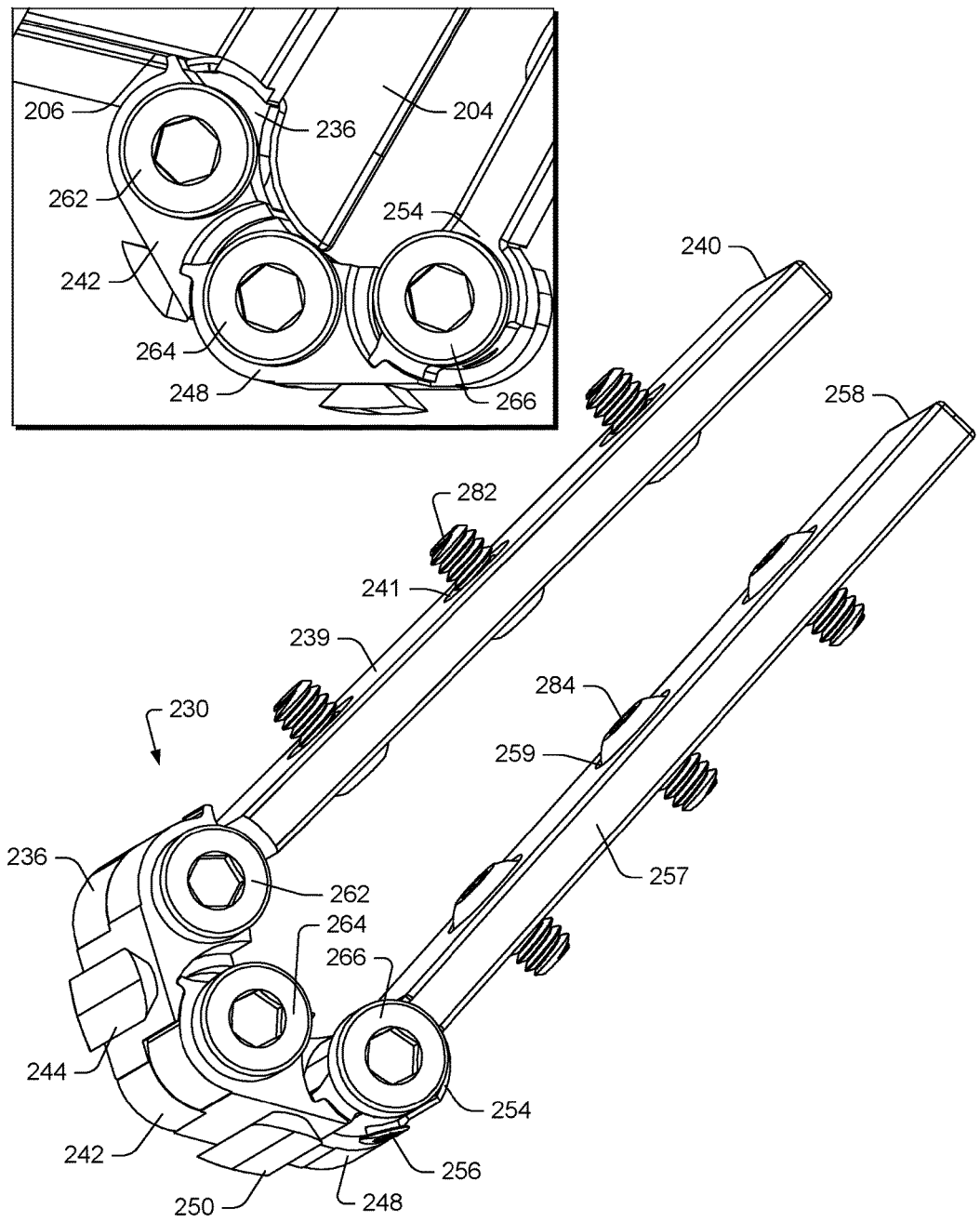
FIG. 5 is a diagram of the hinge assembly of FIG. 4.

FIG. 5 shows the hinge assembly 230, which may be the left side hinge assembly 230-2 of FIG. 2, along with the link ends 236 and 254, which include the extensions 239 and 257, respectively, that extend to the extensions ends 240 and 258, respectively, where connection features such as, for example, the openings 241 and 259, can receive the bolts 282 and 284 (e.g., screws, etc.), respectively, to operatively couple the hinge assembly 230 to a first housing and to a second housing (e.g., the first housing 202 and the second housing 204). For example, the housing 202 may be operatively coupled to the extension 257 and the housing 204 may be operatively coupled to the extension 239.

The hinge assembly of FIG. 4 and the hinge assembly of FIG. 5 are described with common reference numerals as to common features, noting that various components may be mirror images, for example, for implementation in an arrangement such as in the device 200 of FIG. 2.

In FIG. 5, axles 262, 264 and 266 are shown, which can be set along axes such as the axes 237, 243 and 249 in FIG. 4. As shown in FIG. 5, the axle 262 can pivotably couple the link end 236 and the link 242, the axle 264 can pivotably couple the link 242 and the link 248 and the axle 266 can pivotably couple the link 248 and the link end 254. As an example, an axle can include a threaded portion and a link and/or an link end can include a threaded portion that can receive threads of an axle, for example, to secure and axle and to secure a link to an link end or a link to a link.

FIG. 5 also shows the hinge assembly 230 along with the housing 204, which includes a shoulder 206. As shown, the link 242 can contact the housing 204, for example, at the shoulder 206. As an example, the link end 254 can contact a shoulder of the link 248. As an example, the link 248 can contact a shoulder of the link 242. As an example, one or more surfaces where contact may occur may be referred to as stop surfaces. As an example, various stop surfaces may define one or more radii of curvature (e.g., a minimum radius of curvature, a maximum radius of curvature, etc.).

Figure 6:
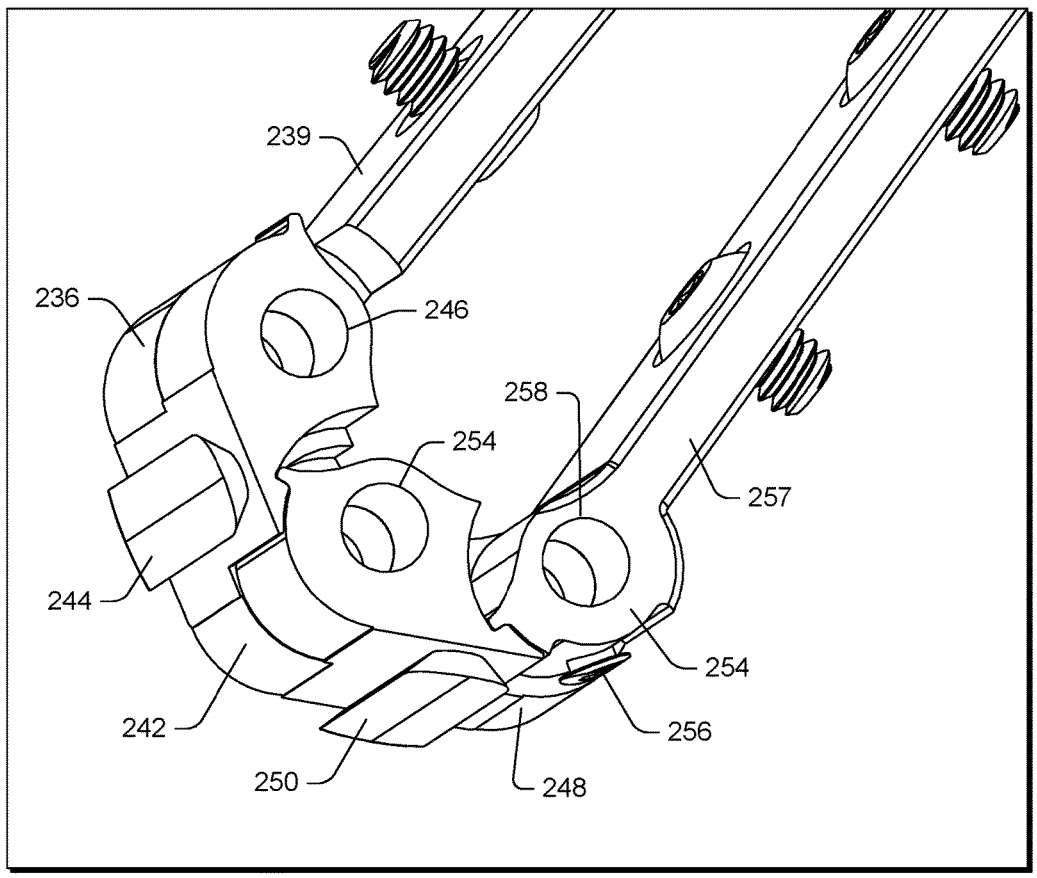
FIG. 6 is a diagram of a portion of the hinge assembly of FIG. 4.

FIG. 6 shows a portion of the hinge assembly 230 of FIG. 5 without the axles 262, 264 and 266. As shown, the link 242 includes a bore 246 to receive the axle 262, the link 248 includes a bore 254 to receive the axle 264 and the link end 254 includes a bore 258 to receive the axle 266. In the example of FIG. 6, the link end 236 includes a bore to receive the axle 262, the link 242 includes a bore to receive the axle 264 and the link 248 includes a bore to receive the axle 266 where such bores may be partial bores such that ends of the axles 262, 264 and 266 are not exposed but rather covered, which may be for purposes of aesthetics and/or to avoid intrusion of debris.

Figure 7:
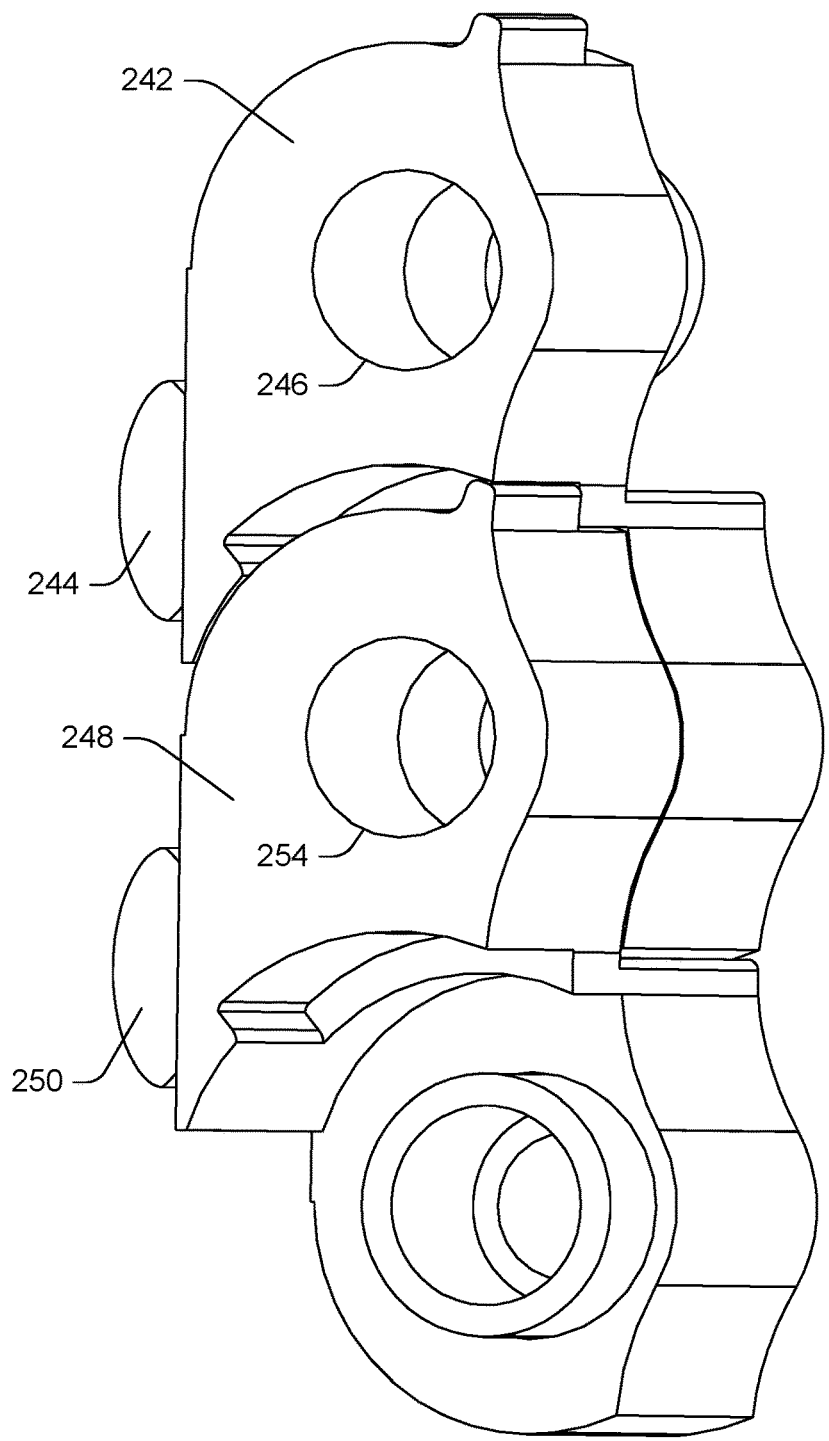
FIG. 7 is a diagram of a portion of the hinge assembly of FIG. 4.

FIG. 7 shows the link 242 and its bore 246 and the link 248 and its bore 254. In the example of FIG. 7, the links 242 and 248 are in an orientation that corresponds to the open orientation of the device 200 of FIG. 2 (e.g., open at an angle of about 180 degrees). In FIG. 7, the plate fixtures 244 and 250 can be seen to be substantially along a line that is substantially parallel to axes of the bores 246 and 254.

Figure 8:
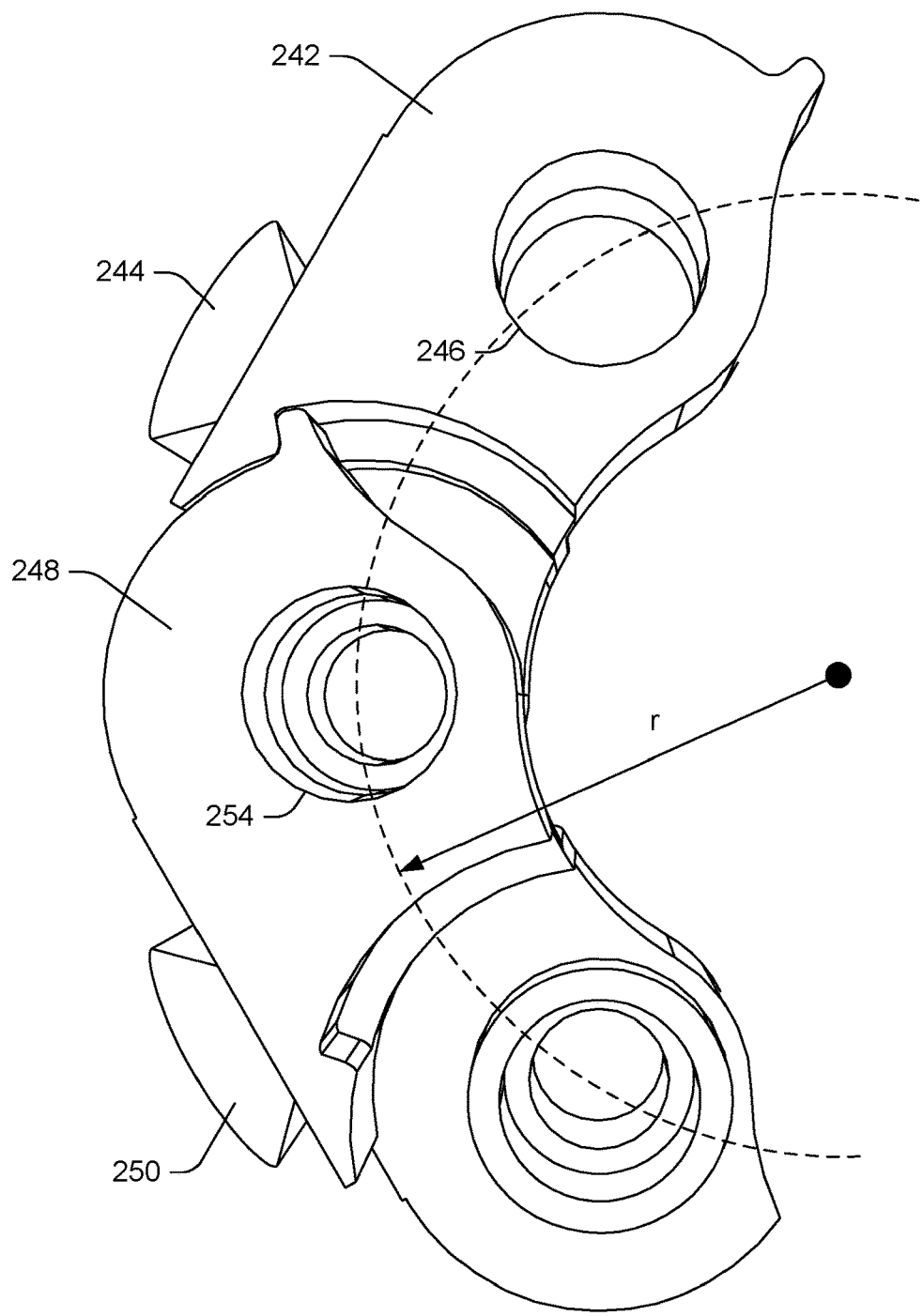
FIG. 8 is a diagram of the portion of the hinge assembly of FIG. 7.

FIG. 8 shows the link 242 and its bore 246 and the link 248 and its bore 254. In the example of FIG. 8, the links 242 and 248 are in an orientation that corresponds to the closed orientation of the device 200 of FIG. 2 (e.g., closed at an angle of about 0 degrees). As shown in FIG. 8, the links 242 and 248 can define a minimum radius of curvature (r). In FIG. 8, the plate fixtures 244 and 250 can be seen to be substantially along a radius of curvature that is substantially concentric to the radius of curvature defined by the axes of the bores 246 and 254. Further, the plate fixtures 244 and 250 can include outer surfaces that may be, for example, shaped as a portion of a cylinder that is defined by a radius.

In the example of FIG. 8, features of the link 242 and features of the link 248 can determine a range of relative motion about an axis of the bore 254. Various features may be stop surfaces, which contact and limit relative rotation of the links 242 and 248 with respect to each other. As shown, each of the links 242 and 254 includes two bores such that limited rotation about a common bore can limit the relationship of the other non-common bores with respect to each other.

Figure 9:
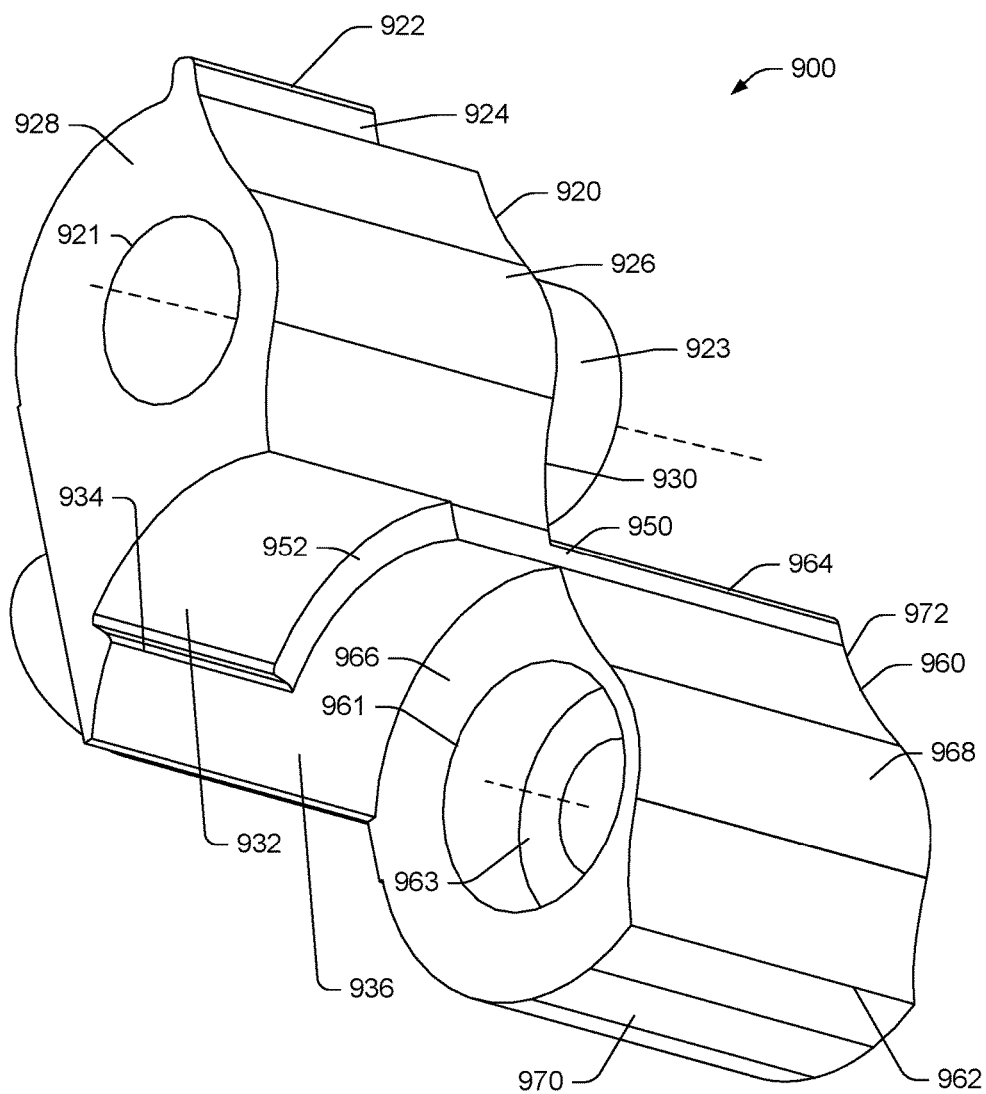
FIG. 9 is a diagram of an example of a link.

FIG. 9 shows an example of a link 900, which may be suitably utilized as the link 242 or the link 248 shown in, for example, FIG. 7 and FIG. 8. In the example of FIG. 9, the link 900 includes a portion 920 and a portion 960 that are connected via a bridge portion 950 (e.g., a jog). As shown, the portions 920 and 960 can be offset axially where, for example, the portion 920 includes a bore 921 and where the portion 960 includes a bore 961 that define bore axes that can be substantially parallel, yet offset.

As shown in the example of FIG. 9, the portion 920 includes the bore 921 and a cylindrical extension 923 aligned along the axis of the bore 921. In the example of FIG. 9, the portion 920 also includes an end 922, a tongue 924 that extends to the end 922 from a surface 926 disposed between opposing side surfaces 928 and 930 where a recessed surface 932 is set at a radius of curvature where a shoulder 934 extends to another surface 936 that is set at a radius of curvature. As an example, the portion 920 can include stop surfaces, for example, consider a surface of the shoulder 934 being a stop surface and a surface of the tongue 924 (e.g., a lower surface on the underside of the tongue 924) being a stop surface. In such an example, when paired with another link, contact can occur between the stop surface of the tongue and the stop surface of the shoulder, as adjacent a recess.

As shown in the example of FIG. 9, the portion 960 includes the bore 961, an axial face 963 (e.g., of a stepped bore), and end 962, an end 964, opposing side surfaces 966 and 972 and a surface 968 disposed between the opposing side surfaces 966 and 972 and extending from the end 962 to the end 964.

In the example of FIG. 9, the shapes of the surfaces 926 and 968 may conform to corresponding shapes of a housing or housings. For example, as shown in FIG. 3, the shapes of the links can conform to shapes of the housing 202 and/or the housing 204 when the device 200 is oriented in a closed orientation. As an example, the shapes of the links can conform to shapes of the housing 202 and/or the housing 204 when the device 200 is oriented in an open orientation (see also, e.g., FIG. 17).

Figure 10:
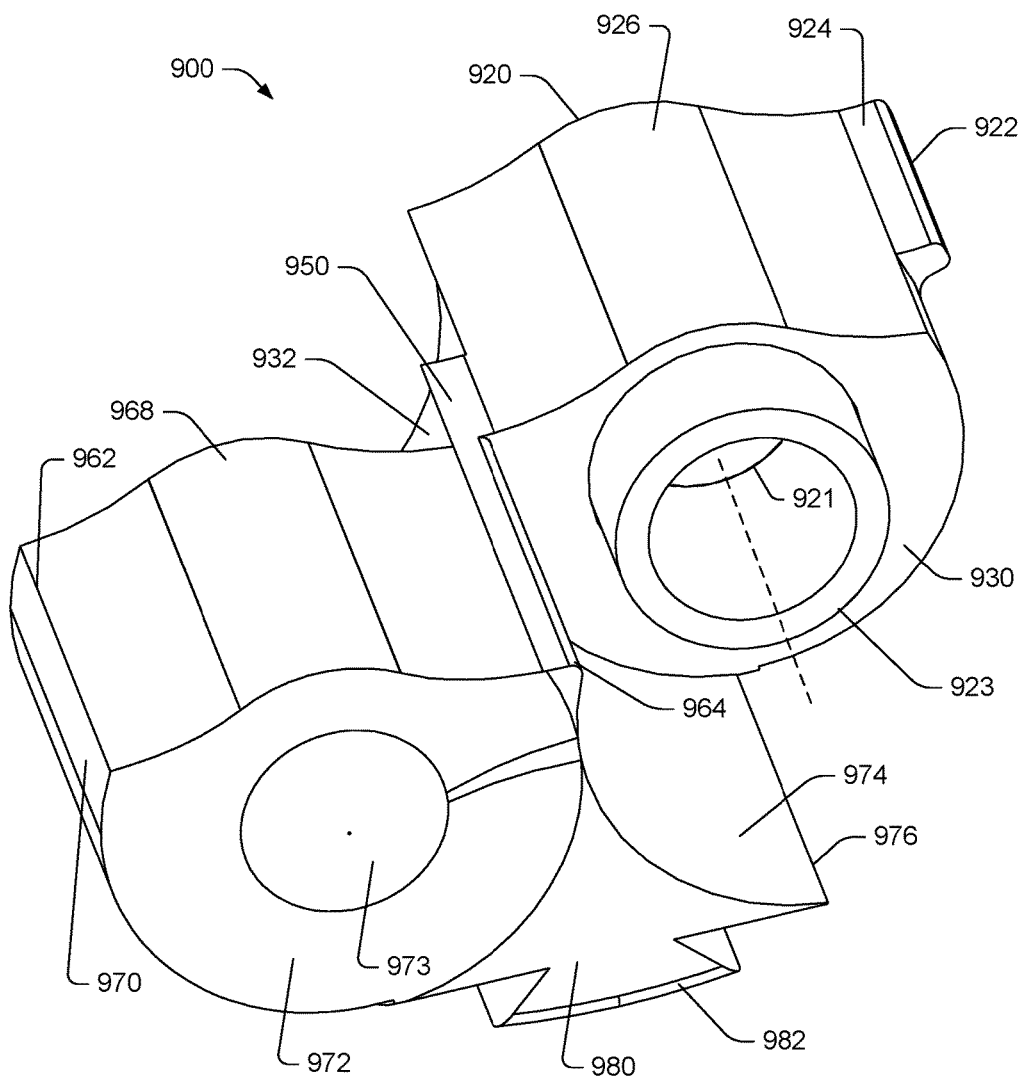
FIG. 10 is a diagram of the link of FIG. 9.

FIG. 10 shows another view of the link 900 of FIG. 9. As shown in the example of FIG. 10, the portion 960 of the link 900 includes a surface 974 that extends from the end 964 to an end 976. The link 900 also includes a surface 980 associated with a plate fixture that includes a surface 982 that is curved, for example, defined by a radius of curvature.

As mentioned, a link can include a cap, a partial bore, etc. For example, in FIG. 10, the portion 960 of the link 900 is shown as including a cap 973, which may be a separate component or integral part of the link 900. Such a feature may provide for aesthetics and/or protection, for example, against intrusion of debris.

As mentioned, the portion 960 can include a stepped bore and the portion 920 can include an extension, which may be cylindrical in shape. As an example, where two links include such features, the two links may be pivotably coupled at least in part by receipt of at least a portion of the extension in the stepped bore. For example, the extension 923 of the portion 920 of the link 900 may be received by another link that includes a portion such as the portion 960 with the bore 961, including an axial face 963 (e.g., defining a step). As an example, an axle may be received via the bore 921 that extends through the bore 921 and through the extension 923 into a smaller diameter bore disposed axially between an axial face and an end cap where the smaller diameter bore may include threads that can receive threads of the axle. In such a manner, two links may be pivotably coupled where, for example, pivoting may be limited at least in part via contact of stop surfaces, which may define a minimum radius of curvature for the two pivotably coupled links.

Figure 11:
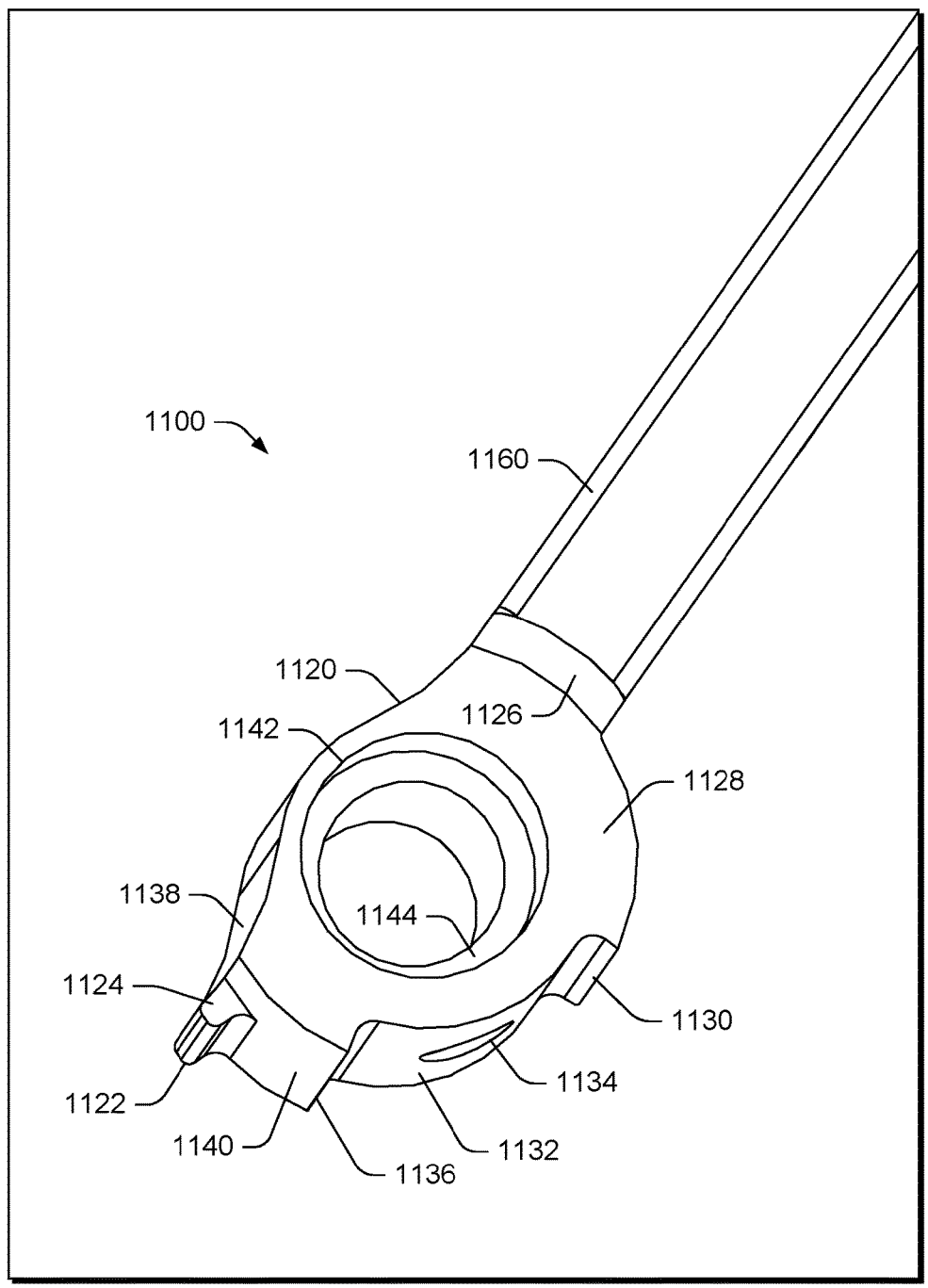
FIG. 11 is a diagram of an example of a link.

FIG. 11 shows an example of a link end 1100. As shown in FIG. 11, the link end 1100 can include an extension 1160 that may be, in part, axially offset from a link portion 1120. The link portion 1120 can include an end 1122, a tongue 1124 that extends to the end 1122, a surface 1126 at an end of the extension 1160, a surface 1128, an end 1130, a recessed surface 1132, and an end 1136 where the recessed surface 1132 may be a plate mating surface where an opening 1134 may be threaded to receive a threaded bolt (e.g., screw, etc.) to secure a plate to the link end 1100. As shown in the example of FIG. 11, the link end 1100 can include a surface 1138 to one side of the tongue 1124 and a surface 1140 to another side of the tongue 1124. The link end 1100 of FIG. 11 is shown as including a bore 1142 and an axial face 1144 disposed in the bore 1142, which may be part of a stepped bore (e.g., a bore with two different radii).

Figure 12:
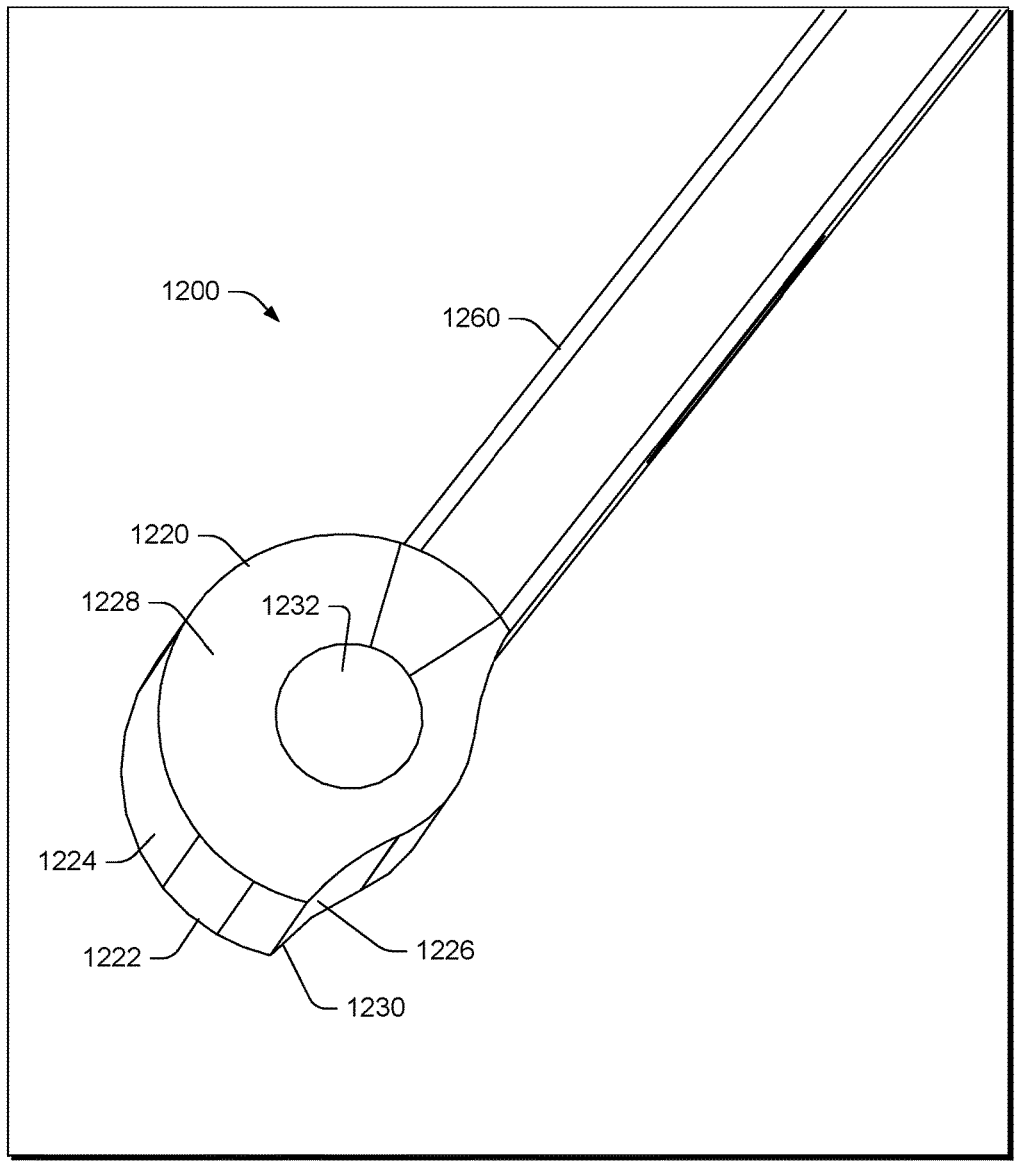
FIG. 12 is a diagram of an example of a link.

FIG. 12 shows an example of a link end 1200. As shown in FIG. 12, the link end 1200 can include an extension 1260 that may be, in part, axially offset from the link portion 1220. The link portion 1220 can include an end 1222, an end 1230, a surface 1224, a surface 1226 and a side surface 1228, which can include an end cap 1232, which may be a separate component or integral to the link end 1200.

Figure 13:
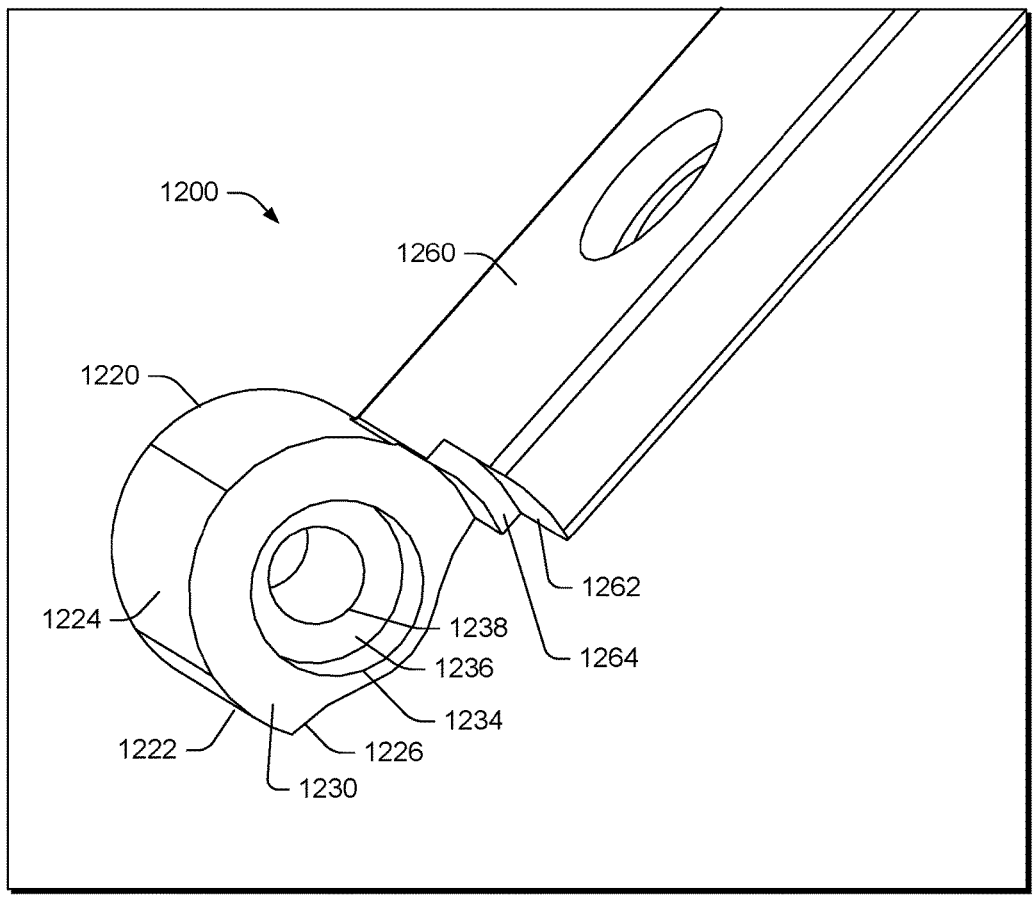
FIG. 13 is a diagram of the link of FIG. 12.

FIG. 13 shows another view of the link end 1200 where a surface 1262 of the extension 1260 is axially offset from the link portion 1220 and where a shoulder 1264 may be defined between the surface 1262 and a surface 1230 of the link portion 1220. As shown in FIG. 13, the link end 1200 can include a bore 1234, an axial face 1236 and a smaller diameter bore 1238 such that the link end 1200 includes a stepped bore. As an example, the smaller diameter bore 1238 may include threads that can receive threads of an axle. As an example, the bore 1234 may receive an extension of a link. As an example, the bore 1234 may receive an extension of a link that includes a bore where an axle may be inserted into the bore of the link where threads of the axle may be threaded into threads of the smaller diameter bore 1238 of the link end 1200 to pivotably couple the link to the link end.

Figure 14:
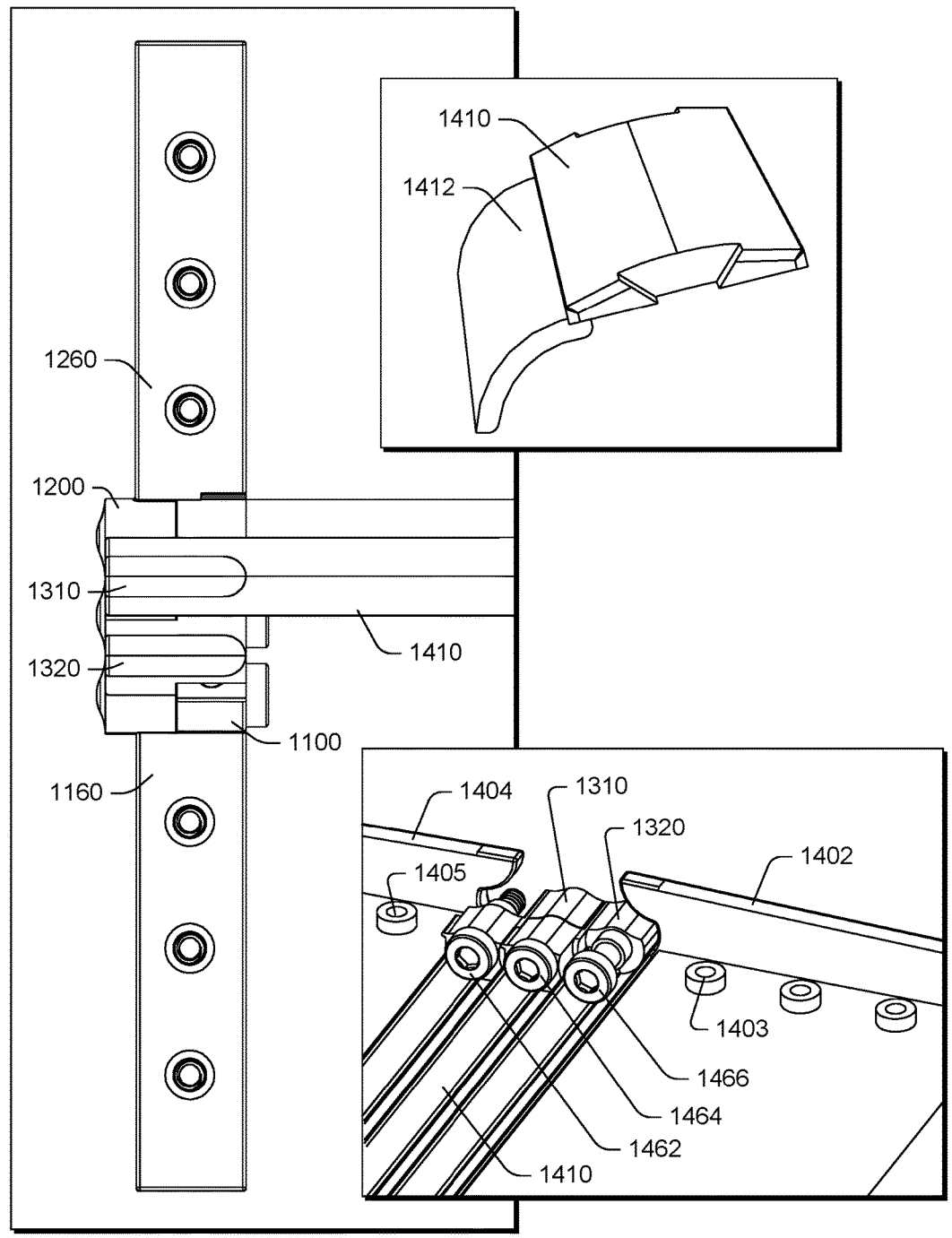
FIG. 14 is a diagram of a portion of an example of a hinge assembly, an example of a plate and a portion of an example of a device.

FIG. 14 shows the link end 1100 and its extension 1160 and the link end 1200 and its extension 1260 along with links 1310 and 1320 and a plate 1410. FIG. 14 also shows a perspective view of the plate 1410 where the plate 1410 includes an extension 1412.

FIG. 14 also shows the links 1310 and 1320 with respect to housings 1402 and 1404 where axles 1462, 1464 and 1466 are present but where the link ends 1100 and 1200 are not included to illustrate examples of connection features (e.g., via an interior view). For example, the housing 1402 can include connection features 1403 and the housing 1404 can include connection features 1405. As an example, the features 1403 and 1405 can include openings that can include threads where, for example, the extension 1160 can be operatively coupled to the housing 1402 via receipt of threaded bolts that pass through openings of the extension 1160 and mate with threads of corresponding features 1403 and where, for example, the extension 1260 can be operatively coupled to the housing 1404 via receipt of threaded bolts that pass through openings of the extension 1260 and mate with threads of corresponding features 1405. As shown in the example of FIG. 14, the axles 1462, 1464 and 1466 can include threads and be of axial lengths sufficient to operatively couple the links 1310 and 1320 and link ends 1100 and 1200. For example, the axle 1462 can operatively couple the link end 1200 and the link 1310, the axle 1464 can operatively couple the links 1310 and 1320 and the axle 1466 can operatively couple the link 1320 and the link end 1100.

Figure 15:
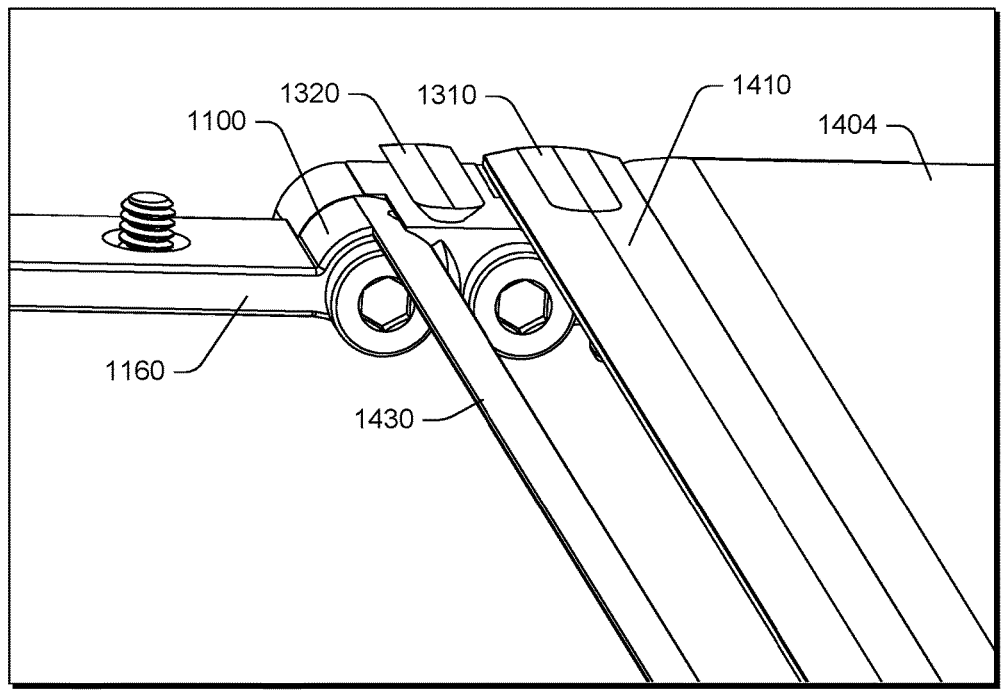
FIG. 15 is a diagram of a portion of an example of a hinge assembly.

FIG. 15 shows the link end 1100 and its extension 1160 and two links 1310 and 1320 along with the plate 1410 and another plate 1430. As shown, the plate 1430 is fixed to the link end 1100 such that pivoting of the link end 1100 causes the plate to move (e.g., rotate). As shown, a gap exists between the link 1320 and the link end 1100 such that the plate 1430 may be received at least in part in the gap, for example, when a hinge assembly is in an open orientation such as that shown in FIG. 15.

Figure 16:
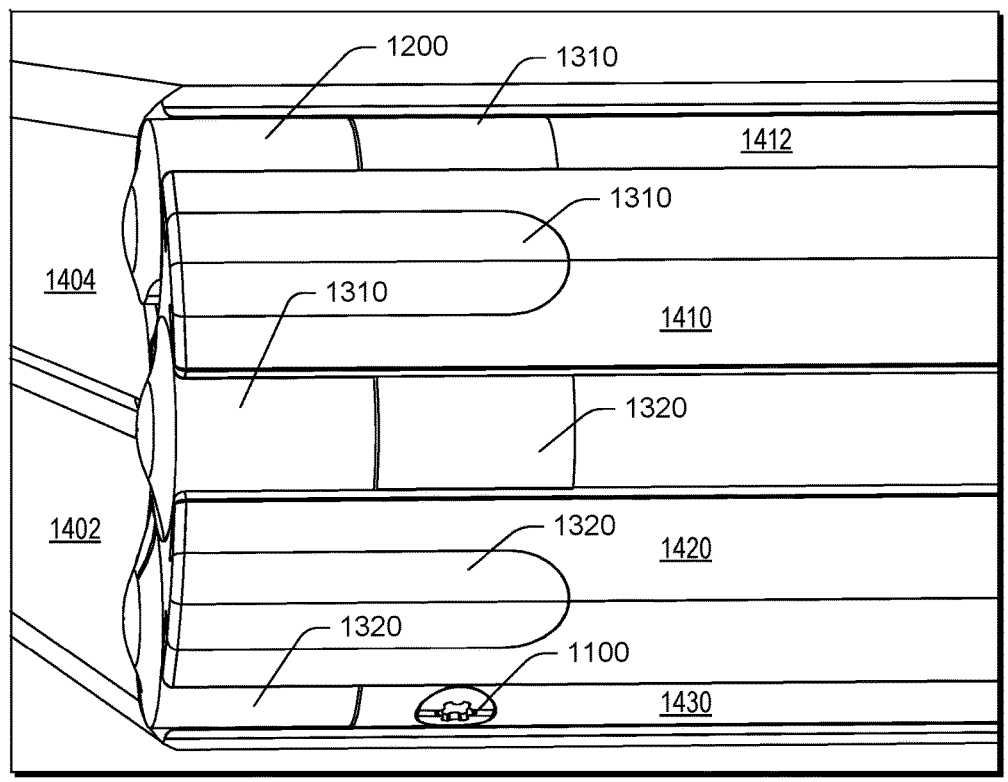
FIG. 16 is a diagram of a portion of an example of a hinge assembly in a closed orientation or close state.

FIG. 16 shows the first housing 1402 and the second housing 1404 operatively coupled via a hinge assembly that includes the link end 1100, a link 1320, a link 1310 and the link end 1200 along with plates 1410, 1420 and 1430 where the plate 1430 is fixed to the end link 1100, where the plate 1420 is fixed to the link 1320 and where the plate 1410 is fixed to the link 1310. In such an example, the plates 1410, 1420 and 1430 can cover the back end of a device that includes the housings 1402 and 1404 when they are in a closed orientation. Such an arrangement may provide for aesthetics and/or for avoiding intrusion of debris, etc. As an example, the plates 1410 and 1420 can include plate extensions that are disposed at a radius that is smaller than a radius of another portion of the plates. For example, an extension of the plate 1420 can be disposed at a radius such that it fits underneath the plate 1410. As an example, the plate 1410 can include an extension that can slide underneath an end of the housing 1604. As mentioned, the plate 1430 can slide at least in part into a gap, which can be below the plate 1420.

Figure 17:
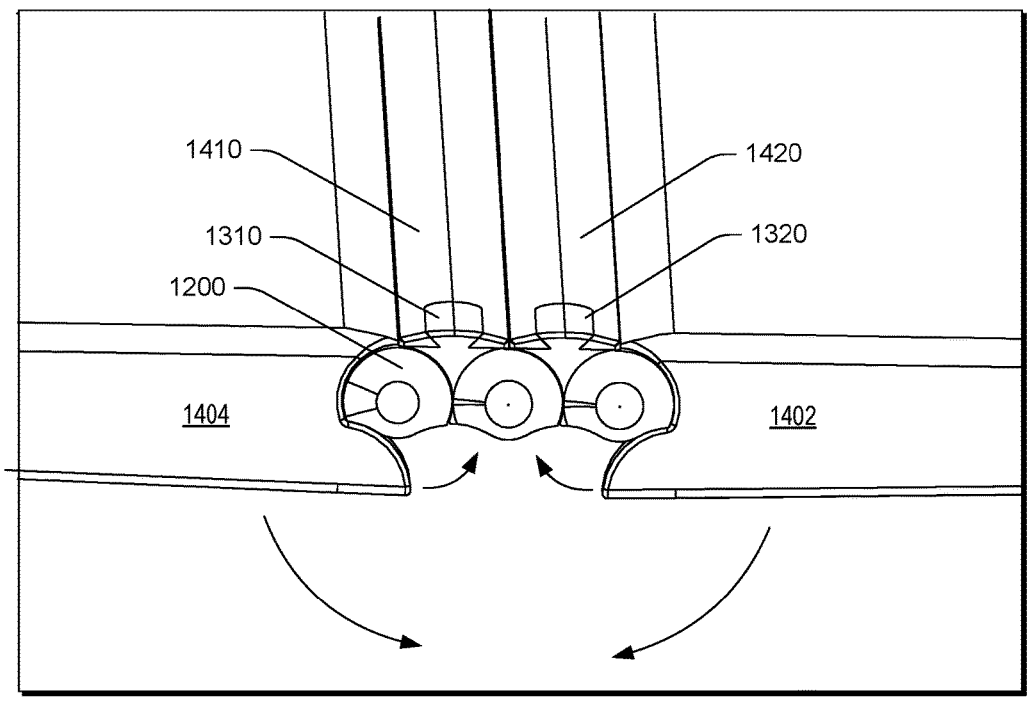
FIG. 17 is a diagram of a portion of the hinge assembly of FIG. 16 in an open orientation or open state.

FIG. 17 shows an example of the first housing 1402 and the second housing 1404 in an open orientation where the plates 1410 and 1420 form a relatively continuous surface across a hinge assembly that joins the first housing 1402 and the second housing 1404. In the orientation of FIG. 17, the links 1310 and 1320 are visible from the back side via the plate fixtures and visible from the end side via capped ends that cover axles. One of the link ends, the link end 1200, is also visible from the end side. As shown, the housing 1402 and 1404 can include shapes that conform to shapes of the links and/or link ends.

Figure 18:
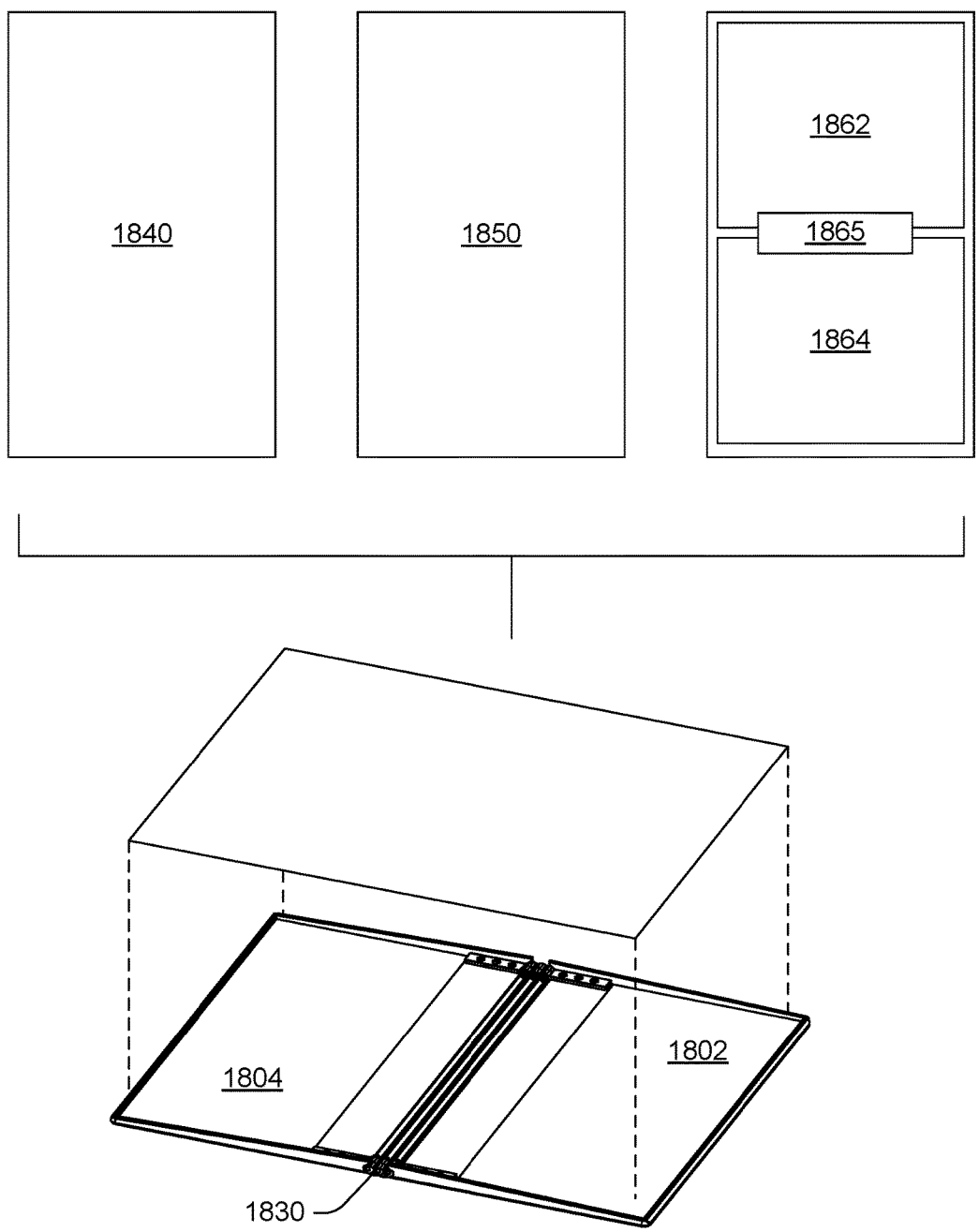
FIG. 18 is a series of diagrams of examples of circuitry that may be included in a device.

FIG. 18 shows examples of circuitry 1840, 1850 and 1862, 1864 and 1865. Such circuitry may be received via a first housing 1802 and a second housing 1804 where, for example, a hinge assembly 1830 operatively couples the first housing 1802 and the second housing 1804 (see also, e.g., the device 200 of FIG. 2). As an example, the circuitry 1840 may be a flexible display (e.g., optionally a flexible touchscreen display), the circuitry 1850 may be a flexible circuit board, and the circuitry 1865 may be flexible and operatively couple the circuitry 1862 and the circuitry 1864 (e.g., which may include display and/or other circuitry). For example, the circuitry 1865 may be or include flexible wires, flexible optical guides (e.g., flat, fiber, etc.). As an example, a housing can include one or more ports that may allow for connections (e.g., power, display, bus, memory, etc.). As an example, one or more connections may provide for electrical and/or optical connection(s) to circuitry that can be housed in the first housing 1802, the second housing 1804 or the first and second housings 1802 and 1804.

As an example, a flexible display may be bendable in a first direction and bendable in a second direction. As an example, a flexible display may be bendable in a first direction but not bendable in a second direction, for example, consider a flexible display that is in a substantially flat (e.g., planar) orientation where it can be bent in one direction to create a radius of curvature bend that brings ends of the flexible display closer to each other but where the flexible display is not bendable in an opposing direction (e.g., without risk of damage to the flexible display). In such an example, the flexible display may be disposed in two housings of a device such that the flexible display is bendable to form a bend and two portions, one portion to each side of the bend, such that the two housings can be closed, for example, to protect the flexible display and reduce overall length of the device. In such an example, the two housings may be opened to a desired angle with respect to each other where the angle may be less than about 180 degrees. In the foregoing two examples, a lobster hinge assembly may provide a radius of curvature when the two housings are closed where the flexible display is not bent beyond a specified radius of curvature (e.g., where bending further may compromise integrity of the flexible display).

As an example, an apparatus can include a processor; memory accessible by the processor; a first housing that includes a first link end; a second housing that includes a second link end; and a hinge assembly that includes a first link coupled to the first link end via a first axle, a second link coupled to the second link end via a second axle and an intermediate axle that operatively couples the first link and the second link where stop surfaces of the first and second links define a minimum radius of curvature of the hinge assembly. As an example, a link end can include a stop surface, for example, a link end can include a tongue that can contact a shoulder of a link where the tongue includes a stop surface and where the shoulder includes a stop surface.

As an example, a hinge assembly can include a first hinge assembly and a second hinge assembly. In such an example, an apparatus can include curved plates that bridge the first hinge assembly and the second hinge assembly.

As an example, a first link and a second link can be coupled via an intermediate axle, which may be disposed in aligned bores of the first and second link. As an example, the bores may be aligned via an extension of one link that fits into a stepped bore the other link. In such an example, the extension may be a cylindrical wall or a portion of a cylindrical wall. As an example, a stepped bore can include an axial portion with a first diameter and an axial portion with a second diameter where one of the axial portions may include threads, etc.

As an example, a hinge assembly may include a plurality of intermediate axles. For example, a hinge assembly may include a first intermediate axle and a second intermediate axle and a third link where the first and second intermediate axles operatively coupled the first, second and third links.

As an example, a link can include a tongue that includes a stop surface and another link can include a recess that includes a stop surface, such as, for example, a surface of a shoulder that defines in part the recess.

As an example, a link end can include a tongue that includes a stop surface and a link can include a recess that includes a stop surface.

As an example, a housing can include a shoulder that may include a stop surface, for example, that can be contacted by a surface of a link (e.g., a surface of a tongue of a link).

As an example, a hinge assembly can include an axial width defined by a first link end and a first link being coupled to a first axle. As an example, a first link can include a jog that axially offsets a first portion of the first link and a second portion of the first link. For example, a jog may be a bridge which may be an integral portion of a link.

As an example, a hinge assembly or hinge assemblies may be or form a lobster hinge assembly.

As an example, a link end can include a curved plate mount. For example, consider an opening that can include threads to receive a threaded component that can secure a curved plate to the link end.

As an example, a first link can include a curved plate mount and a second link can include a curved plate mount. In such an example, a first curved plate may be mounted to a first link end, a second curved plate mounted to the first link and a third curved plate mounted to the second link. In such an example, a second link end may not include a curved plate mount.

As an example, an apparatus can include a processor; memory accessible by the processor; a first housing; a second housing; and a hinge assembly operatively coupled to the first and second housings where the hinge assembly includes a first set of links and at least three axles, a second set of links and at least three axles and plates that extend between at least some of the links of the first and second sets of links where a set of stop surfaces of the links define a minimum radius of curvature of the hinge assembly. In such an example, a planar surface of the first housing and a planar surface of the second housing can be substantially parallel at the minimum radius of curvature. As an example, another set of stop surfaces of the links may define a maximum radius of curvature of the hinge assembly. As an example, a stop surface may be part of a housing, for example, a housing may include a shoulder or other feature that can act as a stop surface.

As an example, a planar surface of a first housing and a planar surface of a second housing may be disposed in a substantially common plane at a maximum radius of curvature of a hinge assembly or hinge assemblies.

As an example, plates can cover a portion of an apparatus and can span, for example, two or more hinge assemblies. As an example, plates can include curved plates.

As an example, an apparatus can include a processor; memory accessible by the processor; a first housing; a second housing; and a hinge assembly operatively coupled to the first and second housings where the hinge assembly includes a first set of links and at least three axles, a second set of links and at least three axles and plates that extend between at least some of the links of the first and second sets of links where a set of stop surfaces of the links define a minimum radius of curvature of the hinge assembly. In such an example, the apparatus can include a flexible circuit board. For example, consider a flexible display that is housed at least in part by the first housing and at least in part by the second housing. As an example, at least a portion of a flexible display may include a touchscreen display. As an example, an apparatus may be a smart phone that can be opened and closed via a hinge assembly or hinge assemblies.

As an example, a hinge assembly or hinge assemblies may be or form a lobster hinge assembly. As an example, a lobster hinge assembly can include a first set of links and link ends and a second set of links and link ends and plates that are operatively coupled to the first and second sets. Such plates may be substantially exposed in one orientation and partially covered in another orientation. Such plates may overlap at least in part, for example, to avoid gaps where debris may enter.

As an example, a method can include defining a minimum radius of curvature for a flexible circuit board disposed in part in a first housing and a second housing via a hinge assembly operatively coupled to the first and second housings where the hinge assembly includes a first set of links and at least three axles, a second set of links and at least three axles where a set of stop surfaces of the links defines the minimum radius of curvature of the hinge assembly. In such an example, the method may include defining a maximum radius of curvature for the flexible circuit board via another set of stop surfaces of the links.

As an example, in a closed orientation of first and second housings that correspond to a minimum radius of curvature, a flexible circuit board may be in a U shape, for example, where a bended portion may be limited as to its radius of curvature by the minimum radius of curvature of the housings in the closed orientation. As an example, in an open orientation of the first and second housings that corresponds to a maximum radius of curvature, the flexible circuit board can include a planar shape, for example, a planar shape that spans at least a portion of the first and the second housings.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 19:
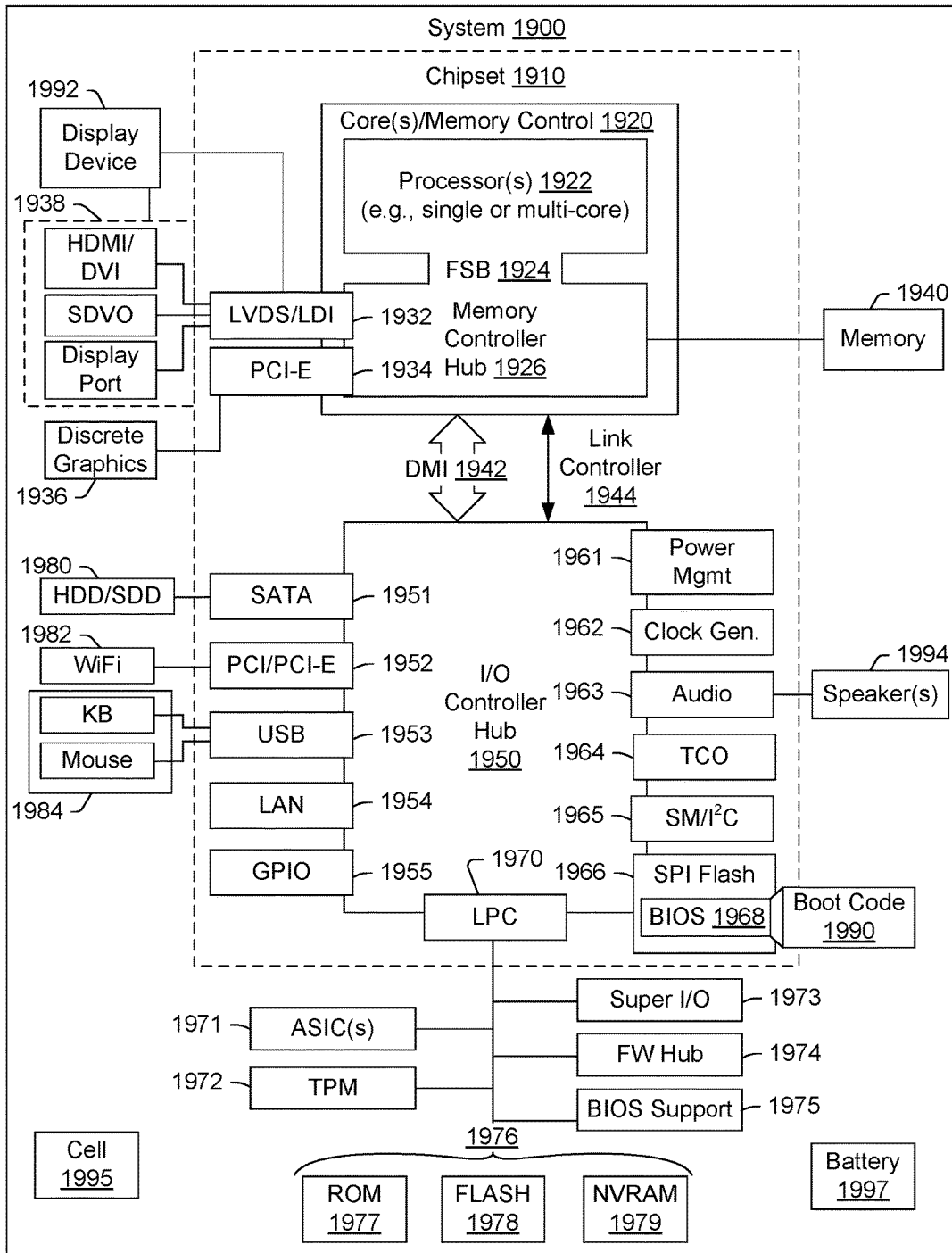
FIG. 19 is a diagram of an example of a system that includes one or more processors.

While various examples of circuits or circuitry have been discussed, FIG. 19 depicts a block diagram of an illustrative computer system 1900. The system 1900 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1900. As an example, a system such as the system 100 of FIG. 1 may include at least some of the features of the system 1900; a device such as the device 200 of FIG. 2 may include at least some of the features of the system 1900; etc.

As shown in FIG. 19, the system 1900 includes a so-called chipset 1910. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 19, the chipset 1910 has a particular architecture, which may vary to some extent depending on brand or manufacturer. The architecture of the chipset 1910 includes a core and memory control group 1920 and an I/O controller hub 1950 that exchange information (e.g., data, signals, commands, etc.) via, for example, a direct management interface or direct media interface (DMI) 1942 or a link controller 1944. In the example of FIG. 19, the DMI 1942 is a chip-to-chip interface (sometimes referred to as being a link between a "northbridge" and a "southbridge").

The core and memory control group 1920 include one or more processors 1922 (e.g., single core or multi-core) and a memory controller hub 1926 that exchange information via a front side bus (FSB) 1924. As described herein, various components of the core and memory control group 1920 may be integrated onto a single processor die, for example, to make a chip that supplants the conventional "northbridge" style architecture.

The memory controller hub 1926 interfaces with memory 1940. For example, the memory controller hub 1926 may provide support for DDR SDRAM memory (e.g., DDR, DDR2, DDR3, etc.). In general, the memory 1940 is a type of random-access memory (RAM). It is often referred to as "system memory".

The memory controller hub 1926 further includes a low-voltage differential signaling interface (LVDS) 1932. The LVDS 1932 may be a so-called LVDS Display Interface (LDI) for support of a display device 1992 (e.g., a CRT, a flat panel, a projector, etc.). A block 1938 includes some examples of technologies that may be supported via the LVDS interface 1932 (e.g., serial digital video, HDMI/DVI, display port). The memory controller hub 1926 also includes one or more PCI-express interfaces (PCI-E) 1934, for example, for support of discrete graphics 1936. Discrete graphics using a PCI-E interface has become an alternative approach to an accelerated graphics port (AGP). For example, the memory controller hub 1926 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1950 includes a variety of interfaces. The example of FIG. 19 includes a SATA interface 1951, one or more PCI-E interfaces 1952 (optionally one or more legacy PCI interfaces), one or more USB interfaces 1953, a LAN interface 1954 (more generally a network interface), a general purpose I/O interface (GPIO) 1955, a low-pin count (LPC) interface 1970, a power management interface 1961, a clock generator interface 1962, an audio interface 1963 (e.g., for speakers 1994), a total cost of operation (TCO) interface 1964, a system management bus interface (e.g., a multi-master serial computer bus interface) 1965, and a serial peripheral flash memory/controller interface (SPI Flash) 1966, which, in the example of FIG. 19, includes BIOS 1968 and boot code 1990. With respect to network connections, the I/O hub controller 1950 may include integrated gigabit Ethernet controller lines multiplexed with a PCI-E interface port. Other network features may operate independent of a PCI-E interface.

The interfaces of the I/O hub controller 1950 provide for communication with various devices, networks, etc. For example, the SATA interface 1951 provides for reading, writing or reading and writing information on one or more drives 1980 such as HDDs, SDDs or a combination thereof. The I/O hub controller 1950 may also include an advanced host controller interface (AHCI) to support one or more drives 1980. The PCI-E interface 1952 allows for wireless connections 1982 to devices, networks, etc. The USB interface 1953 provides for input devices 1984 such as keyboards (KB), one or more optical sensors, mice and various other devices (e.g., microphones, cameras, phones, storage, media players, etc.). On or more other types of sensors may optionally rely on the USB interface 1953 or another interface (e.g., I²C, etc.). As to microphones, the system 1900 of FIG. 19 may include hardware (e.g., audio card) appropriately configured for receipt of sound (e.g., user voice, ambient sound, etc.).

In the example of FIG. 19, the LPC interface 1970 provides for use of one or more ASICs 1971, a trusted platform module (TPM) 1972, a super I/O 1973, a firmware hub 1974, BIOS support 1975 as well as various types of memory 1976 such as ROM 1977, Flash 1978, and non-volatile RAM (NVRAM) 1979. With respect to the TPM 1972, this module may be in the form of a chip that can be used to authenticate software and hardware devices. For example, a TPM may be capable of performing platform authentication and may be used to verify that a system seeking access is the expected system.

The system 1900, upon power on, may be configured to execute boot code 1990 for the BIOS 1968, as stored within the SPI Flash 1966, and thereafter processes data under the control of one or more operating systems and application software (e.g., stored in system memory 1940). An operating system may be stored in any of a variety of locations and accessed, for example, according to instructions of the BIOS 1968. Again, as described herein, a satellite, a base, a server or other machine may include fewer or more features than shown in the system 1900 of FIG. 19. Further, the system 1900 of FIG. 19 is shown as optionally include cell phone circuitry 1995, which may include GSM, CDMA, etc., types of circuitry configured for coordinated operation with one or more of the other features of the system 1900. Also shown in FIG. 19 is battery circuitry 1997, which may provide one or more battery, power, etc., associated features (e.g., optionally to instruct one or more other components of the system 1900). As an example, a SMBus may be operable via a LPC (see, e.g., the LPC interface 1970), via an I²C interface (see, e.g., the SM/I²C interface 1965), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
   a processor;
   memory accessible by the processor;
   a first housing that comprises a first link end;
   a second housing that comprises a second link end; and
   a hinge assembly that comprises
     a first link that comprises axially offset first and second portions wherein the second portion of the first link is coupled to the first link end via a first axle having a first axis,
     a second link that comprises axially offset first and second portions wherein the first portion of the second link is coupled to the second link end via a second axle having a second axis,
     an intermediate axle, having a third axis, that couples the first portion of the first link in a side-by-side arrangement to the second portion of the second link, wherein the second portion of the first link comprises a shoulder as a first stop surface, wherein the second portion of the second link comprises a tongue as a second stop surface, and wherein the first and second stop surfaces contact to define a minimum radius of curvature of the hinge assembly by an arc that passes through the first, second and third axes.

2. The apparatus of claim 1 wherein the hinge assembly comprises a first hinge assembly and further comprising a second hinge assembly.

3. The apparatus of claim 2 comprising curved plates that bridge the first hinge assembly and the second hinge assembly.

4. The apparatus of claim 1 wherein the first link end comprises a tongue that comprises an additional stop surface.

5. The apparatus of claim 1 wherein the hinge assembly comprises an axial width defined by the first link end and the first link being coupled to the first axle.

6. The apparatus of claim 1 wherein the first link comprise a jog that axially offsets the first portion of the first link and the second portion of the first link.

7. The apparatus of claim 1 wherein the first link end comprises a curved plate mount.

8. The apparatus of claim 1 wherein the first link comprises a curved plate mount and wherein the second link comprises a curved plate mount.

9. The apparatus of claim 1 comprising a first curved plate mounted to the first link end, a second curved plate mounted to the first link and a third curved plate mounted to the second link.

10. The apparatus of claim 9 wherein the second link end does not include a curved plate mount.

11. An apparatus comprising:
a processor;
memory accessible by the processor;
a first housing;
a second housing; and
a hinge assembly operatively coupled to the first and second housings wherein the hinge assembly comprises a first set of links and at least three axles that couple the first set of links in series, a second set of links and at least three axles that couple the second set of links in series and plates that extend between at least some of the links of the first and second sets of links wherein a set of stop surfaces of the links defines a minimum radius of curvature of the hinge assembly by an arc that passes through axes of the axles and wherein each of the first set of links and the second set of links comprises at least one pair of adjacent links wherein each of the adjacent links comprises two portions and a bridge portion that axially offsets the two portions.

12. The apparatus of claim 11 wherein a planar surface of the first housing and a planar surface of the second housing are substantially parallel at the minimum radius of curvature.

13. The apparatus of claim 11 wherein another set of stop surfaces of the links define a maximum radius of curvature of the hinge assembly.

14. The apparatus of claim 13 wherein a planar surface of the first housing and a planar surface of the second housing are substantially within a common plane at the maximum radius of curvature.

15. The apparatus of claim 11 wherein the plates comprise curved plates.

16. The apparatus of claim 11 comprising a flexible circuit board.

17. The apparatus of claim 11 comprising a flexible display that is housed at least in part by the first housing and at least in part by the second housing.

18. The apparatus of claim 17 wherein at least a portion of the flexible display comprises a touchscreen display.

19. The apparatus of claim 11 comprising a smart phone.

20. The apparatus of claim 11 wherein the set of stop surfaces of the links comprises a tongue as a first stop surface of one of the first set of links and a shoulder as a second stop surface of another one of the first set of links wherein contact between the first and second stop surfaces defines the minimum radius of curvature of the hinge assembly.

21. A method comprising:
defining a minimum radius of curvature for a flexible circuit board disposed in part in a first housing and a second housing via a hinge assembly operatively coupled to the first and second housings wherein the hinge assembly comprises a first set of links and at least three axles that couple the first set of links in series, a second set of links and at least three axles that couple the second set of links in series wherein a set of stop surfaces of the links defines a minimum radius of curvature of the hinge assembly by an arc that passes through axes of the axles and wherein each of the first set of links and the second set of links comprises at least one pair of adjacent links wherein each of the adjacent links comprises two portions and a bridge portion that axially offsets the two portions.

22. The method of claim 21 further comprising defining a maximum radius of curvature for the flexible circuit board via another set of stop surfaces of the links that defines a maximum radius of curvature of the hinge assembly by an arc that passes through axes of the axles.

23. The method of claim 22 wherein, in an open orientation of the first and second housings, the flexible circuit board comprises a planar shape.

24. The method of claim 21 wherein, in a closed orientation of the first and second housings that corresponds to the minimum radius of curvature of the hinge assembly by arc that passes through axes of the axles, the flexible circuit board comprises a U shape that comprises the minimum radius of curvature for the flexible circuit board.

25. The method of claim 21 wherein the set of stop surfaces of the links comprises a tongue as a first stop surface of one of the first set of links and a shoulder as a second stop surface of another one of the first set of links wherein contact between the first and second stop surfaces defines the minimum radius of curvature of the hinge assembly.

* * * * *